(12) United States Patent
Lev

(10) Patent No.: US 11,900,695 B2
(45) Date of Patent: Feb. 13, 2024

(54) MARKING AND DETECTING ROAD MARKS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 437 days.

(21) Appl. No.: 17/327,973

(22) Filed: May 24, 2021

(65) Prior Publication Data
US 2022/0284225 A1 Sep. 8, 2022

Related U.S. Application Data

(63) Continuation-in-part of application No. 17/191,793, filed on Mar. 4, 2021, and a continuation-in-part of
(Continued)

(51) Int. Cl.
*G06V 20/56* (2022.01)
*G05D 1/02* (2020.01)
(Continued)

(52) U.S. Cl.
CPC ......... *G06V 20/588* (2022.01); *G05D 1/0242* (2013.01); *G05D 1/0246* (2013.01);
(Continued)

(58) Field of Classification Search
CPC .. G06V 20/582; G06V 20/588; G06D 1/0278; G05D 2201/0202; G04N 7/185; G06T 3/00
See application file for complete search history.

(56) References Cited

U.S. PATENT DOCUMENTS 6,498,570 B2 * 12/2002 Ross ...................... G01S 17/42
250/397
6,922,636 B2 7/2005 Balasubramanian et al.
(Continued)

OTHER PUBLICATIONS

Babic et al. "Application and Characteristics of Waterborne Road Marking Paint", International Journal or Traffic and Transport Engineering, 5(2): 150-169, Jun. 1, 2015.
(Continued)

*Primary Examiner* — Yosef Kassa

(57) ABSTRACT

Disclosed herein are methods and system for detecting road marking expressed using alternating infrared reflective tiles comprising high infrared reflective tiles and low infrared red reflective tiles painted on a road surface using paint material(s) characterized by: (1) reflecting light in visible light spectral range deviating less than a first value from the light reflected by the road surface and (2) reflecting light in an infrared spectral range deviating more than a second value from the light reflected by the road surface. Infrared image(s) and visible light image(s) of the road surface which are registered to each other may be analyzed to compute an infrared reflective value and a luminance value for each pixel respectively. A ratio may be computed between the infrared reflective value of and the luminance value of corresponding pixels to identify high and low infrared reflective tiles in pixels having a ratio exceeding a third value.

15 Claims, 20 Drawing Sheets

Related U.S. Application Data application No. 17/313,161, filed on May 6, 2021, which is a continuation-in-part of application No. 17/191,793, filed on Mar. 4, 2021.

(51) Int. Cl.
  *G06V 10/60* (2022.01)
  *G06V 10/141* (2022.01)
(52) U.S. Cl.
  CPC ............ *G06V 10/141* (2022.01); *G06V 10/60* (2022.01); *G05D 2201/0213* (2013.01)

(56) References Cited

U.S. PATENT DOCUMENTS

| | | | | |
|---|---|---|---|---|
| 7,025,527 | B2* | 4/2006 | Mecham | E01F 9/578 |
| | | | | 404/12 |
| 8,503,728 | B2* | 8/2013 | Takahashi | H04N 7/185 |
| | | | | 382/104 |
| 8,849,508 | B2* | 9/2014 | Ibrahim | G06V 20/588 |
| | | | | 701/301 |
| 8,958,982 | B2* | 2/2015 | Sempuku | G01C 21/3629 |
| | | | | 701/437 |
| 9,230,183 | B2* | 1/2016 | Bechtel | B60R 1/04 |
| 9,721,460 | B2 | 8/2017 | Takemura et al. | |
| 10,147,320 | B1 | 12/2018 | Ellis | |
| 10,309,788 | B2 | 6/2019 | Davidson | |
| 10,635,896 | B2 | 4/2020 | Heimberger et al. | |
| 2022/0282436 | A1 | 9/2022 | Lev | |
| 2022/0284223 | A1 | 9/2022 | Lev | |
| 2022/0284224 | A1 | 9/2022 | Lev | |
| 2022/0284226 | A1 | 9/2022 | Lev | |

OTHER PUBLICATIONS

Smith "Refelective Road Markings Improve Visibility, Safety", Road Markings, Barriers & Workzone Protection, 4 P., Feb. 13, 2012.

Notice of Allowance dated Sep. 20, 2023 from the U.S. Patent and Trademark Office Re. U.S. Appl. No. 17/313,161. (13 pages).

* cited by examiner

MARKING AND DETECTING ROAD MARKS

RELATED APPLICATIONS

This application is a Continuation-in-Part (CIP) of U.S. patent application Ser. No. 17/191,793 filed on Mar. 4, 2021.

This application is also a Continuation-in-Part (CIP) of U.S. patent application Ser. No. 17/313,161 filed on May 6, 2021, which is a Continuation-in-Part (CIP) of U.S. patent application Ser. No. 17/191,793 filed on Mar. 4, 2021.

The contents of the above applications are all incorporated by reference as if fully set forth herein in their entirety.

FIELD AND BACKGROUND OF THE INVENTION

The present invention, in some embodiments thereof, relates to painting driving assistance markings to support automated vehicular systems, and, more specifically, but not exclusively, to painting driving assistance markings which are visible in the infrared spectrum while imperceptible in the human visible light spectrum to support automated vehicular systems.

Road markings have evolved over the years since the introduction of motorized vehicles and the development of roads infrastructures to host these vehicles in order to assist drivers to grasp and understand their motorized environment and take actions accordingly.

Recent times have witnessed major advancement, evolution and in fact revolution in the development and deployment of automated vehicular systems which were initially designed to assist the human drivers and are now aiming to make the vehicles at least partially autonomous and eventually fully autonomous.

Such automated vehicular systems may also rely at least partially on the road markings for their operation, for example, monitor lanes, detect road objects (margins, pedestrian crossings, sidewalks, traffic lights, etc.), control operation of the vehicles (e.g. slow down and/or break in front of traffic circle, maneuver to maintain lane, take turns, etc.) and/or the like.

SUMMARY OF THE INVENTION

According to a first aspect of the present invention there is provided a method of painting driving markings invisible in visible light spectrum, comprising using one or more processors for:

Generating driving assistance markings expressing driving information relating to one or more road segments.

Computing instructions for painting the driving assistance markings on one or more elements of the one or more road segments using one or more paint materials characterized by:
  (1) Reflecting light in a visible light spectral range deviating less than a first value from the visible light spectral range reflected by a surface of the one or more elements.
  (2) Reflecting light in an infrared spectral range deviating more than a second value from the infrared spectral range reflected by the surface of the one or more elements.

Outputting the painting instructions for applying the one or more paint materials on the one or more elements of the one or more road segments according to the instructions such that the driving assistance markings are visible in the infrared spectrum and significantly invisible in the visible spectrum.

According to a second aspect of the present invention there is provided a system for painting driving markings invisible in visible light spectrum, comprising one or more processors configured to execute a code. The code comprising:

Code instructions to generate driving assistance markings expressing driving information relating to one or more road segments.

Code instructions to compute instructions for painting the driving assistance markings on one or more elements of the one or more road segments using one or more paint materials characterized by:
  (1) Reflecting light in a visible light spectral range deviating less than a first value from the visible light spectral range reflected by a surface of the one or more elements.
  (2) Reflecting light in an infrared spectral range deviating more than a second value from the infrared spectral range reflected by the surface of the one or more elements.

Code instructions to output the painting instructions for applying the one or more paint materials on the one or more elements of the one or more road segments according to the instructions such that the driving assistance markings are visible in the infrared spectrum and significantly invisible in the visible spectrum.

According to a third aspect of the present invention there is provided a method of painting automatically driving markings invisible in visible light spectrum, comprising using one or more processors for:

Generating driving assistance markings expressing driving information relating to one or more road segments.

Analyzing one or more images of the one or more road segments to identify a visible light spectral range reflected by one or more surfaces of one or more elements of the one or more road segments.

Selecting one or more paint materials characterized by:
  (1) Reflecting light in a visible light spectral range deviating less than a first value from the visible light spectral range reflected by the surface of the one or more elements.
  (2) Reflecting light in an infrared spectral range deviating more than a second value from the infrared spectral range reflected by the surface of the one or more elements.

Painting the driving assistance markings by applying the one or more selected paint materials on the one or more elements of the one or more road segments such that the driving assistance markings are visible in the infrared spectrum and significantly invisible in the visible spectrum.

According to a fourth aspect of the present invention there is provided a system for painting automatically driving markings invisible in visible light spectrum, comprising one or more processors configured to execute a code. The code comprising:

Code instructions to generate driving assistance markings expressing driving information relating to one or more road segments.

Code instructions to analyze one or more images of the one or more road segments to identify a visible light spectral range reflected by one or more surfaces of one or more elements of the one or more road segments.

Code instructions to select one or more paint materials characterized by:

(1) Reflecting light in a visible light spectral range deviating less than a first value from the visible light spectral range reflected by the surface of the one or more elements (2) Reflecting light in an infrared spectral range deviating more than a second value from the infrared spectral range reflected by the surface of the one or more elements.

Code instructions to paint the driving assistance markings by applying the one or more selected paint materials on the one or more elements of the one or more road segments such that the driving assistance markings are visible in the infrared spectrum and significantly invisible in the visible spectrum.

According to a fifth aspect of the present invention there is provided a method of detecting road marking in infrared spectral range, comprising using one or more processors for:

Receiving one or more infrared images depicting, in one or more infrared spectral ranges, a portion of an edge of a road surface painted with road markings expressed using alternating high and low infrared reflective tiles and one or more visible light images depicting the portion of a road surface in visible light spectral range. The infrared reflective tiles are painted using one or more paint materials characterized by:

(1) Reflecting light in visible light spectral range deviating less than a first value from the light reflected by the road surface.

(2) Reflecting light in an infrared spectral range deviating more than a second value from the light reflected by the road surface.

Registering the one or more infrared images to the one or more visible light images.

Computing a ratio between an infrared reflectiveness value of each of a plurality of pixels of the one or more infrared images and a luminance value computed for a corresponding pixel in the registered one or more visible light images.

Detecting one or more high reflectiveness tiles and one or more low reflectiveness tiles based on a difference, between the ratio of adjacent pixels exceeding a third value.

According to a sixth aspect of the present invention there is provided a system for detecting road marking in infrared spectral range, comprising one or more processor configured to execute a code. The code comprising:

Code instruction to receive one or more infrared images depicting, in one or more infrared spectral ranges, a portion of an edge of a road surface painted with road markings expressed using alternating high and low infrared reflective tiles and one or more visible light images depicting the portion of a road surface in visible light spectral range. The infrared reflective tiles are painted using one or more paint materials characterized by:

(1) Reflecting light in visible light spectral range deviating less than a first value from the light reflected by the road surface.

(2) Reflecting light in an infrared spectral range deviating more than a second value from the light reflected by the road surface.

Code instruction to register the one or more infrared images to the one or more visible light images.

Code instruction to compute a ratio between an infrared reflectiveness value of each of a plurality of pixels of the one or more infrared images and a luminance value computed for a corresponding pixel in the registered one or more visible light images.

Code instruction to detect one or more high reflectiveness tiles and one or more low reflectiveness tiles based on a difference between the ratio of adjacent pixels exceeding a third value.

According to a seventh aspect of the present invention there is provided a computer program product for detecting road marking in infrared spectral range, comprising one or more computer readable storage media having thereon:

First program instructions executable by one or more processor to cause the one or more processor to one or more infrared images depicting, in one or more infrared spectral ranges, a portion of an edge of a road surface painted with road markings expressed using alternating high and low infrared reflective tiles and one or more visible light images depicting the portion of a road surface in visible light spectral range. The infrared reflective tiles are painted using one or more paint materials characterized by:

(1) Reflecting light in visible light spectral range deviating less than a first value from the light reflected by the road surface.

(2) Reflecting light in an infrared spectral range deviating more than a second value from the light reflected by the road surface.

Second program instructions executable by the one or more processor to cause the one or more processor to register the one or more infrared images to the one or more visible light images.

Third program instructions executable by the one or more processor to cause the one or more processor to compute instruction to compute a ratio between an infrared reflectiveness value of each of a plurality of pixels of the one or more infrared images and a luminance value computed for a corresponding pixel in the registered one or more visible light images.

Fourth program instructions executable by the one or more processor to cause the one or more processor to one or more high reflectiveness tiles and one or more low reflectiveness tiles based on a difference between the ratio of adjacent pixels exceeding a third value.

According to an eight aspect of the present invention there is provided a method of computing instructions for painting road markings detectable in infrared spectral range, comprising using one or more processor for:

Computing instructions for painting road markings expressed using alternating high and low infrared reflective tiles on a road surface using one or more paint material characterized by:

(1) Reflecting light in visible light spectral range deviating less than a first value from the light reflected by the road surface.

(2) Reflecting light in an infrared spectral range deviating more than a second value from the light reflected by the road surface.

Outputting the painting instructions for applying the one or more paint material on the road the road such that the road markings are visible in the infrared spectral range and imperceptible in the visible spectral range.

According to a ninth aspect of the present invention there is provided a system for computing instructions for painting road markings detectable in infrared spectral range, comprising one or more processor configured to execute a code. The code comprising:

Code instruction to instructions for painting road markings expressed using alternating high and low infrared reflective tiles on a road surface using one or more paint material characterized by:
(1) Reflecting light in visible light spectral range deviating less than a first value from the light reflected by the road surface.
(2) Reflecting light in an infrared spectral range deviating more than a second value from the light reflected by the road surface;

Code instruction to output the painting instructions for applying the one or more paint material on the road the road such that the road markings are visible in the infrared spectral range and imperceptible in the visible spectral range.

According to a tenth aspect of the present invention there is provided a computer program product for computing instructions for painting road markings detectable in infrared spectral range, comprising one or more computer readable storage media having thereon:

First program instructions executable by one or more processor to cause the one or more processor to compute instructions for painting road markings expressed using alternating high and low infrared reflective tiles on a road surface using one or more paint material characterized by:
(1) Reflecting light in visible light spectral range deviating less than a first value from the light reflected by the road surface.
(2) Reflecting light in an infrared spectral range deviating more than a second value from the light reflected by the road surface.

Second program instructions executable by the one or more processor to cause the one or more processor to output the painting instructions for applying the one or more paint material on the road the road such that the road markings are visible in the infrared spectral range and imperceptible in the visible spectral range.

In a further implementation form of the first, second, third and/or fourth aspects, the first value equals 20% and the second value equals 25%.

In a further implementation form of the first, second, third and/or fourth aspects, the driving assistance markings are directed to support one or more automatic vehicular systems of at last one vehicle. The one or more automatic vehicular systems receive one or more images of the one or more elements painted with the driving assistance markings captured by one or more imaging sensors adapted to operate in the infrared light spectral range.

In a further implementation form of the first, second, third and/or fourth aspects, the driving information comprising information relating to one or more transportation infrastructure objects located in the one or more road segments and/or in one or more subsequent road segments.

In a further implementation form of the first, second, third and/or fourth aspects, the driving information comprising guiding markings to assist one or more automatic vehicular control systems of one or more vehicles to conduct one or more control operations of the one or more vehicles.

In a further implementation form of the first, second, third and/or fourth aspects, the one or more elements are members of a group consisting of: a surface of one or more of the road segments, a colored mark printed on one or more of the road segments and/or an infrastructure object located in proximity to one or more of the road segments.

In a further implementation form of the first and/or second aspects, the painting instruction comprise instructions for painting the driving assistance markings using the one or more paint materials closely around one or more visible markings of the one or more road segments.

In a further implementation form of the first and/or second aspects, the painting instruction comprise instructions for applying the one or more paint material over a painted surface of the one or more element.

In a further implementation form of the first and/or second aspects, the painting instruction comprise instructions for applying the one or more paint materials in conjunction with at least another one paint material used to paint a surface of the one or more elements.

In a further implementation form of the first, second, third and/or fourth aspects, the infrared light spectral range characteristic to one or more of the paint materials is in a range of near infrared (NIR) having a wavelength in a range of 700-1400 nanometers.

In a further implementation form of the first, second, third and/or fourth aspects, the infrared light spectral range characteristic to one or more of the paint materials is in a range of short wave infrared (SWIR) having a wavelength in a range of 1400-3000 nanometers.

In a further implementation form of the third and/or fourth aspects, the driving assistance markings are painted closely around at least one visible marking of the at least one road segment using the at least one paint material.

In a further implementation form of the third and/or fourth aspects, the at least one paint material painting is applied over a painted surface of the at least one element.

In a further implementation form of the third and/or fourth aspects, the at least one paint material painting is applied in conjunction with at least another one paint material used to paint a surface of the at least one element.

In a further implementation form of the fifth, sixth, seventh, eighth, ninth and/or tenth aspects, the first value equals 20%, the second value equals 25% and the third value equals 30%.

In an optional implementation form of the fifth, sixth and/or seventh aspects, the difference of the ratio of each pixel is computed compared to the ratio of the adjacent pixels according to a median computed based on a sliding window comprising a group of pixels around the respective pixel.

In a further implementation form of the fifth, sixth and/or seventh aspects, the sliding window is moved over a section of the registered one or more visible light images and one or more infrared images which includes one or more high infrared reflective tiles and one or more low infrared reflective tiles.

In a further implementation form of the fifth, sixth and/or seventh aspects, the size of the sliding window is 5×5 pixels and is moved in 1 pixel steps.

In a further implementation form of the fifth, sixth, seventh, eighth, ninth and/or tenth aspects, the one or more infrared spectral ranges are members of a group consisting of: near infrared (NIR) having a wavelength in a range of 700-1400 nanometers and/or short wave infrared (SWIR) having a wavelength in a range of 1400-3000 nanometers.

In an optional implementation form of the fifth, sixth and/or seventh aspects, one or more light sources are operated to project light on the portion of the road surface in one or more of a plurality of spectral ranges comprising visible light spectral range and one or more infrared spectral ranges.

In a further implementation form of the fifth, sixth and/or seventh aspects, registering the one or more infrared images to the one or more visible light images is based on one or more reference features painted on the portion of the road surface which is identified in the one or more visible light images and in the one or more infrared images.

In a further implementation form of the fifth, sixth and/or seventh aspects, registering the one or more infrared images to the one or more visible light images is based on a calibration of one or more imaging sensors configured to capture the one or more infrared images with respect to one or more imaging sensors configured to capture the one or more visible light images.

In a further implementation form of the fifth, sixth and/or seventh aspects, the one or more imaging sensors are coupled to one or more vehicles such that a field of view (FOV) of the one or more imaging sensors is parallel to the edge of the road surface.

In a further implementation form of the fifth, sixth and/or seventh aspects, the ratio and difference values are computed for a subset of the plurality of pixels contained in one or more sections of the one or more infrared images which is defined to depict one or more high reflectiveness tiles and one or more low reflectiveness tiles based on a positioning of the one or more imaging sensors configured to capture the one or more infrared images and the one or more visible light images.

In a further implementation form of the fifth, sixth and/or seventh aspects, the detected road markings are output to one or more automatic vehicular systems configured to operate accordingly.

In a further implementation form of the fifth, sixth, seventh, eighth, ninth and/or tenth aspects, the road markings are directed to support the one or more automatic vehicular systems of one or more vehicles by one or more of:
  Provide one or more of the automatic vehicular systems information relating to one or more transportation infrastructure objects located in one or more road segments.
  Assist one or more of the automatic vehicular systems to conduct one or more control operations of one or more of the vehicles.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
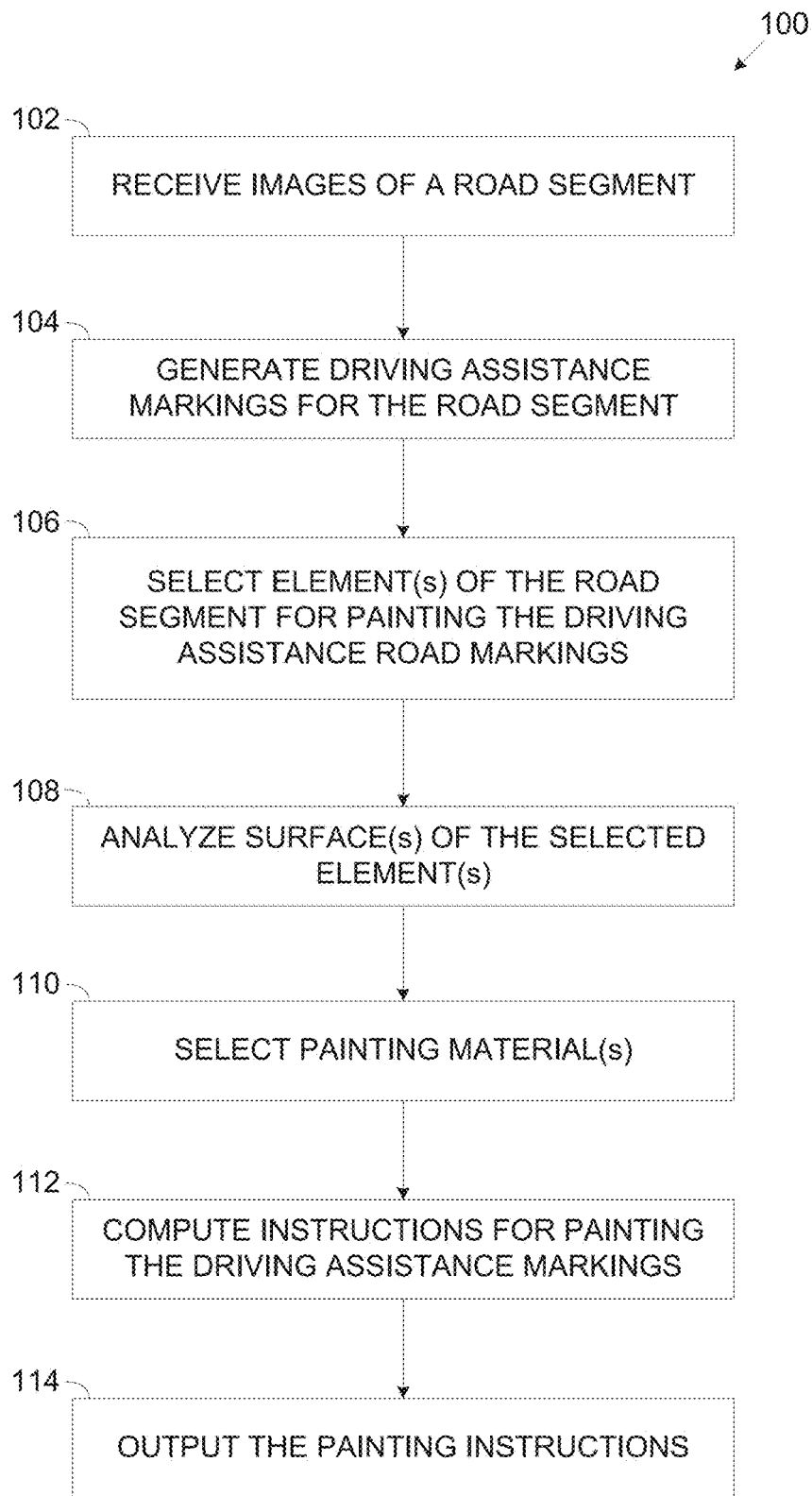
FIG. 1 is a flowchart of an exemplary process of computing instructions for painting driving assistance marking using paint material(s) visible in the infrared spectrum while imperceptible in the visible light spectrum, according to some embodiments of the present invention.

The present invention, in some embodiments thereof, relates to painting driving assistance markings to support automated vehicular systems, and, more specifically, but not exclusively, to painting driving assistance markings which are visible in the infrared spectrum while imperceptible in the human visible light spectrum to support automated vehicular systems.

According to some embodiments of the present invention, there are provided methods, systems and computer program products for computing instructions for painting driving assistance markings which are highly visible in the infrared light spectrum while highly imperceptible in the visible light spectrum. In particular, the driving assistance markings may significantly blend with their background in the visible light range making them significantly imperceptible by the human eye and thus invisible to human drivers.

The term imperceptible as used here in through the document defines objects, markings, printing and/or the like, in particular driving assistance markings which may not be perceived by the human eye since they reflect light in a spectral range which is out of the visible light spectral range (400-700 nanometer).

These driving assistance markings which are highly imperceptible to the human drivers are therefore directed to support automated vehicular systems, for example, an Advanced Driving Assistance System (ADAS), a vehicular monitoring system, a vehicular alert system, a vehicular control system and/or the like installed in one or more vehicles which may be manual, partially autonomous and/or fully autonomous.

Specifically, the driving assistance markings are directed for such automated vehicular systems which are capable of operating in the infrared light spectrum, in particulate, systems which are coupled, integrated and/or connected to one or more imaging sensors, for example, a camera, an infrared camera, a thermal mapping camera, a Light Detection and Ranging (LiDAR) sensor and/or the like configured to capture images of the vehicle's surroundings in the infrared spectrum, for example, Near Infrared (NIR), Short Wave Infrared (SWIR) and/or the like.

The driving assistance markings generated for one or more road segments may express informative directions and/or operation assistance information. For example, one or more informative driving assistance markings may indicate presence and optionally distance to one or more objects in the respective road segment and/or of one or more subsequent road segments, for example, a pedestrian crossing, a railroad crossing, a traffic light, a junction, a maximal allowed speed and/or the like. In another example, one or more operation assistance driving assistance markings may include markers, pointers, guides, keys and/or the like which may be identified and used by the automated vehicular systems to maneuver the vehicles, for example, break, accelerate, decelerate, turn and/or the like.

The driving assistance markings generated for the road segment(s) may be painted (applied) on one or more elements of the respective road segment, for example, one or more surface sections of the road segment, one or more colored marks painted on the road segment (e.g., lane separator lines, arrows, stop lines, pedestrian crossings, etc.) and/or one or more infrastructure objects located in proximity to the road segment (e.g., next to, on, above, etc.), for example, pavement surfaces and/or edges, traffic poles, traffic lights, structure walls and/or the like.

In order to ensure that the driving assistance markings are highly visible in the infrared spectrum while substantially imperceptible in the visible light spectrum and hence imperceptible to the human drivers, the driving assistance markings may be painted to significantly blend with their background in the visible light range while be significantly distinguishable from their background in the infrared spectral range. To this end the driving assistance markings may be painted using one or more infrared reflective paint materials which are characterized by two main characteristics.

First, the infrared reflective paint materials selected for painting the driving assistance markings must not significantly deviate from the color of the surface of the element(s) selected for painting the driving assistance markings. This means that the visible light reflected by the selected infrared reflective paint material(s) must not deviate by more than a certain value (e.g. 10%, 15%, 20%, etc.) from the visible light spectrum reflected by the surface of the selected element(s).

In addition, the infrared reflective paint materials selected for painting the driving assistance markings must be significantly distinguishable from the surface of the selected element(s) in the infrared spectrum. This means that the infrared spectral range reflected by the selected infrared reflective paint material(s) must deviate by more than a certain value (e.g. 25%, 30%, 35%, etc.) from the infrared spectral range reflected by the surface of the selected element(s).

While for brevity the paint material(s) selected for painting the driving assistance markings are designated infrared reflective paint materials, obviously, the deviation of the infrared reflective paint material(s) compared to their background may be to both directions. This means that the paint material(s) used for painting the driving assistance markings may be more infrared reflective or more absorptive compared to the surrounding background of the markings, i.e., the surface of the selected element(s) on which the markings are painted. When the paint material(s) is more infrared reflective, the driving assistance markings will reflect more infrared light compared to their surrounding background and will be thus visible in the infrared spectrum range. When the paint material(s) is more infrared absorptive, i.e., less infrared reflective, the driving assistance markings will reflect less infrared light compared to their surrounding background and will be therefore also visible in the infrared spectrum range.

Optionally, the driving assistance markings may be painted in proximity, specifically closely around one or more visible road markings of one or more of the road segments, for example, lane separator markings, road side border line markings, pedestrian crossings, painted direction symbols, painted text and/or the like.

Painting the driving assistance markings using the infrared reflective paint materials and computing instructions thereof may present major advantages and benefits compared to currently existing methods and systems for applying road markings in roads.

First, while the human perception and recognition of road markings may be limited, the automated vehicular systems may have a significantly larger capacity for detecting and recognizing large volumes of road markings. These automated vehicular systems may therefore benefit from extensive additional driving assistance markings which may express and deliver increased volumes of information relating to the road segments and/or may provide increased, improved and/or enhanced assistance with vehicle control actions. However, in case the extensive road markings are visible as may be done using existing methods for applying road markings, the road markings may cause a major clutter which may significantly overload human drivers' perception which may lead to human mistakes potentially resulting in dangerous scenarios and increased risk on the road. In contrast, painting (applying) the additional driving assistance markings using the infrared reflective paint material(s) such that the driving assistance markings are imperceptible to the human drivers while visible to the infrared capable automated vehicular systems may overcome the clutter limitation while highly enhancing the assistance and support to the automated vehicular systems.

Moreover, existing (legacy) automated vehicular systems which similarly to the human drivers rely on visible light road markings may be also highly degraded in case the additional driving assistance markings are visible in the visible light spectrum. Such existing (legacy) automated vehicular systems may be limited in their ability to distinguish between extensive road markings painted in close proximity and all visible in the same light spectrum. On the other hand, the existing automated vehicular systems may be oblivious and unaware of the additional driving assistance markings which are only visible in the infrared spectrum thus prevent the overload and degradation in the operation of these legacy systems.

Furthermore, applying (painting) driving assistance markings in two different light spectrums, namely the visible light and the infrared spectrums may allow for increased detection and/or redundancy since the road markings, even identical markings, may be captured by imaging sensors in two distinct domains. The performance, for example, accuracy, robustness, reliability and/or certainty of the detection of the automated vehicular systems may be highly increased when relying on imagery data captured in both the visible light and infrared spectrums, typically by different imaging sensors. Moreover, visible light markings may be significantly undetectable under certain circumstances, for example, low illumination, large distance and/or the like. Relying on the infrared visible road markings may therefore enable the automated vehicular systems to operate with high performance in such scenarios.

In addition, distracting objects which are typically visible in the visible light spectrum, for example, spilled paint, trash and/or any other object that may be located on the road segment or in its close vicinity may be erroneously detected and/or interpreted by the automated vehicular systems as valid road markings which are visible in the visible light spectrum. Such degraded detection may result in potential erroneous detection that may lead to dangerous, critical and even fatal situation. Painting the driving assistance markings to be visible in the infrared spectrum, on the other hand, may significantly increase the detection performance, specifically robustness, reliability and/or reliability since infrared reflectance and/or absorption may be rare in naturally occurring objects such as the distracting objects thus making these naturally occurring objects significantly imperceptible in the infrared spectrum which may reduce and even completely prevent erroneous detection of these object as valid road markings.

Also, adding visible road markings (visible in the visible light spectrum) may be subject to regulation since they may affect the road conditions and perception as described herein before. Adding the infrared visible driving assistance markings on the other hand, may not be subject to any such regulation which may be highly costly, timely and/or demanding, since the additional road markings are imperceptible and practically invisible to the human drivers and/or to the existing automated vehicular systems configured to operate in the visible light spectrum.

Finally, painting the infrared visible driving assistance markings in proximity to visible road markings may significantly increase accuracy, robustness, reliability and/or certainty of the automated vehicular systems to detect of the driving assistance markings. Moreover, the automated vehicular systems may ignore and/or avoid erroneous interpretation of potential infrared reflective materials and/or sections of the road segment arbitrarily present in one or more of the road segments.

According to some embodiments of the present invention, there are provided methods, systems and computer program products for computing instructions for painting, in one or more road segments, alternating infrared reflective tiles which are highly perceptible (visible) in one or more infrared spectral ranges, for example, NIR, SWIR and/or the like while highly imperceptible (invisible) in the visible light spectral range.

The alternating infrared reflective tiles may be painted on the road surface as polygonal shapes, for example, quadruple shapes using one or more paint materials characterized by reflecting visible light deviating by less than a first value, for example, 10%, 15%, 20% and/or the like from the visible light reflected by the road surface. However, in one or more of the infrared spectral ranges, the alternating infrared reflective tiles deviate by more than a second value, for example, 20%, 25%, 30% and/or the like from the infrared light reflected by the road surface.

Moreover, the alternating infrared reflective tiles include high infrared reflective tiles and low infrared reflective tiles which are painted alternately thus forming the alternating infrared reflective tiles. The high infrared reflective tiles may reflect significantly more infrared light than the and low infrared reflective tiles such that in in one or more of the infrared spectral ranges, the high infrared reflective tiles may be significantly more perceptible (visible) compared to the low infrared reflective tiles. To this end, the high infrared reflective tiles may be painted using one or more paint materials which are highly reflective in the infrared spectral range(s), for example, deviating by more than the second value from the infrared light reflected by the road surface, specifically reflecting more infrared light than the road surface. The low infrared reflective tiles, on the other hand, may be painted using one or more paint materials which are highly absorptive in the infrared spectral range(s) but also deviate by more than the second value from the infrared light reflected by the road surface, for example, reflecting less infrared light lower by the second value from the infrared reflected by the road surface.

The alternating infrared reflective tiles may be used to express road markings which may be used by one or more of the automated vehicular systems to control one or roe vehicles as described herein before. The road markings may be expressed and/or indicated by the alternating infrared reflective tiles themselves, for example, by their locations, position, shape, dimensions and/or the like. However, the alternating infrared reflective tiles may serve as reference, indicator, marker, frame and/or the like for road markings that may be further captured, analyzed and used by the automated vehicular systems.

One or more of the automated vehicular systems may be configured to identify in one or more of the infrared spectral ranges the alternating infrared reflective tiles painted on the road surface manually and/or automatically by one or more road markings painting apparatuses, systems, machines and/or the like. The alternating infrared reflective tiles, in particular the road markings encoded and/or expressed using the alternating infrared reflective tiles may be painted on the road surface according to instructions computed manually by one or more expert users and/or automatically as described herein before.

The automated vehicular system(s) may receive a plurality of images captured by one or more of the imaging sensors configured to operate in the plurality of light spectral ranges, specifically in the visible light spectrum and in one or more of the infrared spectral ranges, for example, NIR, SWIR and/or the like.

In particular, one or more imaging sensors coupled, mounted, attached and/or integrated in one or more vehicles may be positioned to monitor road surface sections painted with the alternating infrared reflective tiles, for example, positioned to monitor the road edge, positioned to have their Field of View (FOV) parallel to the road surface and/or the like.

The automated vehicular systems may first register the images captured in the visible light spectral range with the images captured in the infrared spectral range(s) to establish a common reference, for example, a common coordinate system. As such each pixel in one image may be mapped to its corresponding pixel in the other image(s) and may therefore depict the same spectral location in the real world.

After the images are registered, a luminance value may be computed for each pixel in the visible light image(s) while an infrared reflectiveness value may be computed for each corresponding pixel in the infrared image(s). Moreover, a ratio may be computed between the infrared reflectiveness value and the luminance value for each pixel.

Based on a difference between the ratio values of adjacent pixels, the edges, borders and/or lines of the alternating infrared reflective tiles may be detected.

Moreover, one or more smoothing and/or enactment algorithms may be applied to further improve detection of the edges, borders and/or lines of the alternating infrared reflective tiles. For example, a sliding window may be applied to the images to compute a median value for the ratio values of each pixel compared to its neighboring adjacent pixels. Based on the median values computed for the pixels, the edges, borders and/or lines of the alternating infrared reflective tiles may be detected with higher precision, accuracy, reliability and/or robustness.

Painting the alternating infrared reflective tiles using the infrared reflective and/or absorptive paint materials may present major advantages and benefits compared to currently existing methods and systems for applying road markings.

First, applying the alternating infrared reflective tiles on the road surface using one or more paint materials which deviate by less than the first value from the light reflected by the road surface may make the alternating infrared reflective tiles significantly imperceptible (invisible) in the visible light spectral range. As such, while highly usable by the automated vehicular systems having extensive processing resources, human drivers may be unaware and hence understated by the alternating infrared reflective tiles which painted in materials visible in the visible light spectral range may add significant clutter potentially overloading the human driver perception.

Moreover, as they are imperceptible (invisible) in the visible light spectral range, the alternating infrared reflective tiles may not be subject to excessive and strict regulation.

Furthermore, detecting the alternating infrared reflective tiles based on the ratio between their infrared reflectiveness and their visible light luminance (brightness) may significantly distinguish the alternating infrared reflective tiles from naturally occurring elements, objects and/or markings which typically are highly bland and unnoticeable in the infrared spectral range(s).

In addition, applying the smoothing algorithms, for example, the media computation based on the sliding window may significantly increase the detection of the alternating infrared reflective tiles edges and borders thus significantly increasing detection performance of the alternating infrared reflective tiles, for example, precision, accuracy, reliability, consistency, robustness and/or the like.

Also, capturing images in the infrared spectrum to support detection of the alternating infrared reflective tiles may be done using standard equipment, for example, LiDAR sensors which are already deployed in modern vehicles and therefore impose no additional costs, complexity and/or effort to facilitate capturing of the infrared images.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of computing instructions for painting driving assistance marking using paint material(s) visible in the infrared spectrum while imperceptible in the visible light spectrum, according to some embodiments of the present invention.

An exemplary process 100 may be executed for computing instructions for painting driving assistance markings to support one or more automated vehicular systems, for example, an ADAS system, a vehicular monitoring system, a vehicular alert system, a vehicular control system and/or the like installed in one or more vehicles which may be fully manual with one or more alert systems, partially autonomous and/or fully autonomous.

Specifically, the driving assistance markings are painted on one or more elements of one or more road segments such that the driving assistance markings are highly visible in the infrared spectral range (e.g. NIR, SWIR) while significantly imperceptible and thus practically invisible in the visible light range. Imperceptible in the visible light spectrum, the driving assistance markings are therefore highly imperceptible by human drivers as well as to automated vehicular systems which are based in visible light imaging.

Automated vehicular systems which are capable of analyzing infrared spectrum images on the other hand may identify the driving assistance markings which may express informative and/or operation assistance information.

The imperceptible driving assistance markings may therefore provide additional driving assistance information beyond the traditional road markings which may be used by the infrared enabled vehicular systems while preventing visual clutter which may overload perception of the drivers and/or of the visual light spectrum based systems.

Figure 2:
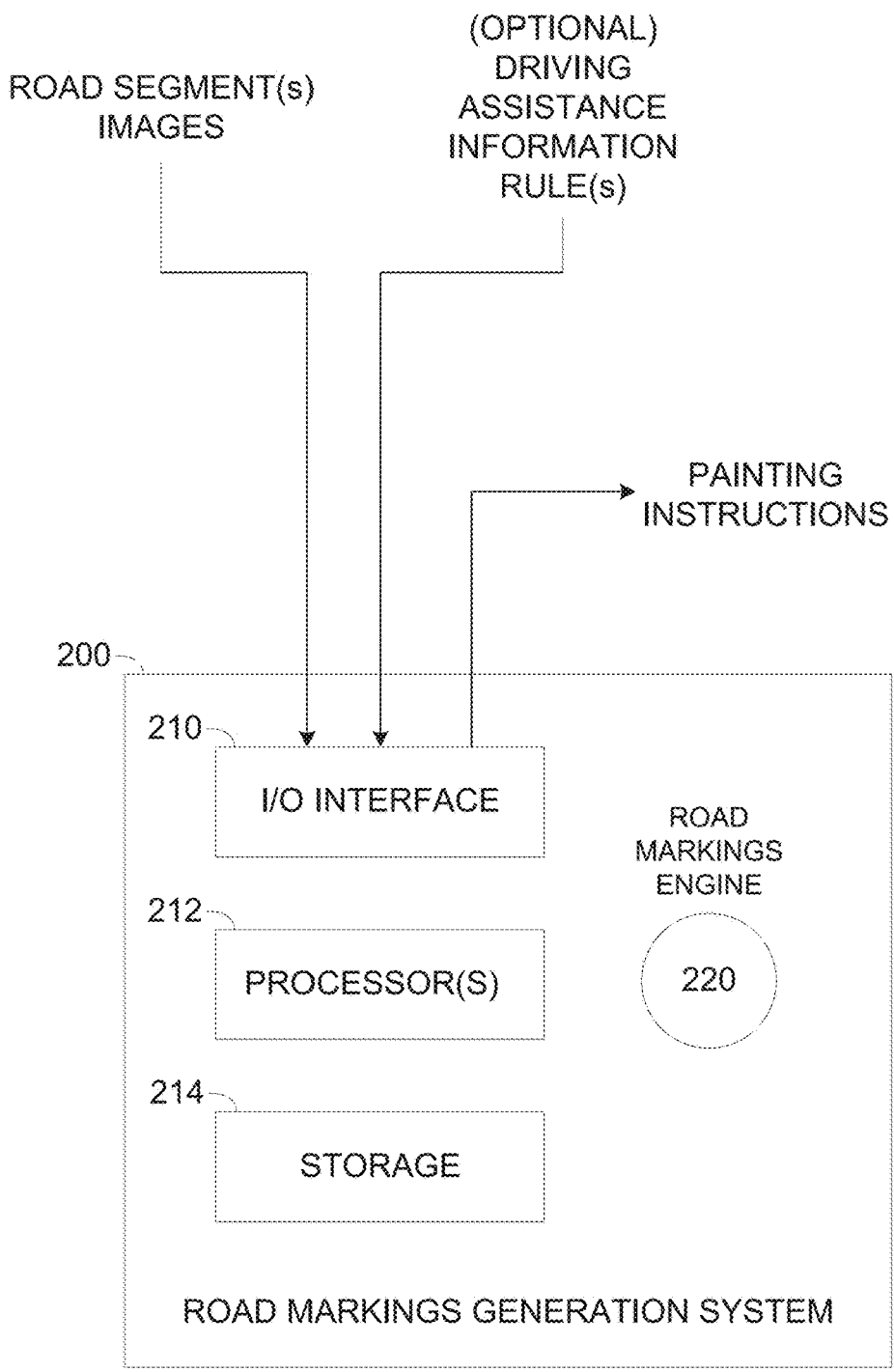
FIG. 2 is a schematic illustration of an exemplary system for computing instructions for painting driving assistance marking using paint material(s) visible in the infrared spectrum while imperceptible in the visible light spectrum, according to some embodiments of the present invention.

Reference is also made to FIG. 2, which is a schematic illustration of an exemplary system for computing instructions for painting driving assistance marking using paint material(s) visible in the infrared spectrum while imperceptible in the visible light spectrum, according to some embodiments of the present invention.

An exemplary road markings generation system 200, for example, a computer, a server, a processing node, a cluster of computing nodes and/or the like may be configured to execute a process such as the process 100 for computing instructions for painting driving assistance markings which are visible in in the infrared spectrum wile imperceptible in the visible light spectrum.

The road markings generation system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the road markings generation system 200 may obtain, for example, fetch, receive, acquire and/or the like one or more images of one or more road segments. For example, the road markings generation system 200 may connect to one or more of the networks, through the network interface(s) available in the I/O interface 210, to communicate with one or more networked resources storing one or more of the images. In another example, the road markings generation system 200 may access one or more attachable devices attached to interconnection interface(s) available in the I/O interface 210, for example, a USB storage device storing, capturing and/or recording one or more of the images.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the road markings generation system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute a road markings engine 220 functional module for executing the process 100 to generate driving assistance markings and compute instructions for painting the driving assistance markings using one or more infrared visible paint materials such that the driving assistance markings are highly visible in the infrared spectrum while significantly imperceptible and potentially completely invisible in the visible light spectrum.

The road markings engine 220 may further output the painting instructions computed for painting the driving assistance markings using one or more of the infrared visible paint materials.

Optionally, the road markings engine 220 may receive one or more driving assistance information rules which may be applicable for one or more of the road segments.

Optionally, the road markings generation system 200, specifically the road markings engine 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

For brevity, the process 100 executed by road markings engine 220 is described for computing instructions for painting driving assistance markings in a single road segment. This, however, should not be construed as limiting since the process 100 may be expanded for computing painting instructions for driving assistance markings in a plurality of road segments.

As shown at 102, the process 100 starts with the road markings engine 220 receiving one or more images of a road segment.

The image(s) may be captured at ground level, from an elevated location (e.g. building, poles, posts, etc.), from the air (e.g. by a drone, an aircraft, etc.), from space (satellite) and/or the like such that the road segment may be depicted from one or more elevation points and/or angles.

The road markings engine 220 may receive the image(s) from one or more sources. For example, one or more images may be retrieved from one or more data stores, for example, a database, a storage server, a storage service and/or the like which stores images depicting one or more road segments. In another example, one or more of the images may be received from one or more mapping services, for example, goggle earth, google street view and/or the like.

As shown at 104, the road markings engine 220 may generate driving assistance markings for the road segment, in particular the road markings engine 220 may generate the driving assistance markings based on analysis of the image(s) of the road segment.

The computed driving assistance markings are directed to support one or more automated vehicular systems of one or more vehicles riding through the road segment. Such automated vehicular systems may include, for example, one or more ADAS systems as known in the art configured to assist vehicle drivers. In another example, the automated vehicular systems may include one or more monitoring systems configured to monitor the environment of the vehicle and report, alert and/or otherwise indicate of one or more potential hazards, risks and/or conditions detected in the road segment. In another example, the automated vehicular systems may include one or more automatic vehicular control systems of one or more at least partially autonomous vehicles configured to control operation of the vehicle (e.g. break, maneuver, accelerate, etc.) based on one or more conditions, potential hazards and/or the like detected in the road segment.

Specifically, the driving assistance markings generated by the road markings engine 220 are intended to be added (painted) to the road segment such that the driving assistance markings are visible in the infrared spectrum, for example, NIR, SWIR and/or the like while significantly imperceptible in the visible light spectrum. The driving assistance markings are therefore directed to support automated vehicular systems which are capable of operating in the infrared spectrum, in particular, automated vehicular systems which integrate, employ, connect and/or communicate with one or more imaging sensors, for example, a camera, infrared camera, a thermal camera, a Light Detection and Ranging (LiDAR) sensor and/or the like adapted to operate in the infrared spectral range, for example, NIR, SWIR and/or the like.

The driving assistance markings generated by the road markings engine 220 may express driving information relating to the road segment. The driving information expressed by the driving assistance markings may include descriptive information relating to one or more transportation infrastructure objects located in the road segment as identified by analyzing the image(s), for example, a junction, a traffic light, a traffic sign, a pedestrian crossing, a bridge, a tunnel, a freeway and/or the like. For example, assuming there is a 4-way junction in the road segment with traffic lights and pedestrian crossings in all four directions. In such case, the road markings engine 220 may generate driving assistance markings which report the presence of the 4-way junction in the road segment. In particular, the road markings engine 220 may generate driving assistance markings which indicate the distance to the 4-way junction in the road segment, for example, the 4-way junction is 50 meters ahead, 30 meters ahead, 10 meters ahead and/or the like. In another example, assuming there is a sharp left curve in the road segment. In such case, the road markings engine 220 may generate driving assistance markings which report the presence of the sharp left curve in the road segment and may further configure the driving assistance markings to indicate the distance to the sharp left curve.

The driving assistance markings may further express driving information directed to assist one or more of the automatic vehicular control systems of at least one vehicle to conduct at least one control operation of the at least one vehicle. For example, assuming there is a sharp right curve in the road segment. In such case, the road markings engine 220 may generate orientation points road markings extending from a certain distance before the beginning of the right curve through the curve and until the curve end which may be used by the automatic vehicular control system(s) to accurately maneuver the respective vehicle(s) in the sharp curve. In another example, assuming there is a traffic light in the road segment. In such case, the road markings engine 220 may mark a stop line road markings right before the traffic light where vehicles must come to a complete stop. The stop line road markings may be used by as orientation points by the automatic vehicular control system(s) to identify the exact stop location and may control the vehicle(s) accordingly, apply breaks to fully stop the vehicle(s).

The driving assistance markings generated by the road markings engine 220 may express driving information similar to driving information expressed by visible road markings in the road segment which are visible in the visible light spectrum. This may of course be essential for supporting automatic vehicular control systems connected to imaging sensors which operated only in the infrared spectrum and hence monitor the surrounding of the vehicles in the infrared spectrum. However, duplicating the driving assistance markings may also serve for redundancy and/or to improve detection of the road markings in both the visible light spectrum and in the infrared spectrum for automatic vehicular control systems capable of monitoring the surrounding of the vehicle(s) in both the visible light and infrared spectrums.

However, the driving assistance markings generated by the road markings engine 220 may include and/or express additional driving information which is not expressed and/or available from the visible road markings. Traditionally, the road markings are directed for human drivers and are thus presented (painted, drawn, placed, etc.) to be visible in the visible light spectrum. The amount of information expressed by the road markings which may be efficiently consumed and comprehended by human drivers may be limited. The automatic vehicular control system(s) on the other hand may be able to acquire and process much larger volumes of driving information expressed by road markings. However, adding additional driving information visible to the human drivers may lead to major clutter which may overload perception and/or confuse the human drivers and may be therefore inefficient and potentially dangerous. Expressing the additional driving information via the infrared visible driving assistance markings may therefore overcome this limitation since the driving assistance markings are substantially and potentially completely imperceptible to the human drivers while visible to the infrared capable automatic vehicular control system(s) which may use the additional driving information.

The driving assistance markings may include human readable markings which may be identified and recognized by automatic vehicular control system(s) designed, configured and/or adapted to rely on road markings directed for human drivers. However, the driving assistance markings may further include markings, signs, symbols, expressions and/or the like which are directed for machines and may thus not be comprehended by humans, for example, coded data (e.g. barcode, QR code, etc.), machine language symbolic data and/or the like. While incomprehensible by humans, automatic vehicular control system(s) configured accordingly may be of course able to identify, decipher and use such machine directed driving assistance markings.

Optionally, the road markings engine 220 may generate driving assistance markings which are applied in the (current) road segment but may relate to one or more transportation infrastructure objects located in one or more subsequent road segments located after the (current) road segment. For example, assuming there is a mountain tunnel one mile ahead of the (current) road segment. Further assuming that one or more automatic vehicular control system(s) include radar sensors highly suitable for low and/or no illumination imaging. In such case, the automatic vehicular control system(s) may bring the radar sensors online and/or test them prior to entry into the tunnel.

Optionally, the road markings engine 220 may compute one or more of the driving assistance markings according to one or more of the driving assistance information rules which may be received from one or more sources.

The driving assistance information rules may include one or more general rules applicable for a plurality of road segments sharing one or more parameters and/or attributes. For example, a certain general driving assistance information rule may indicate that each road segment which comprises a pedestrian crossing should include driving assistance markings at one or more locations preceding the pedestrian crossing (e.g. 100 meters, 50 meters, 15 meters, etc.) to inform of the upcoming pedestrian crossing. In another example, a certain general driving assistance information rule may indicate that driving assistance markings should be included in each road segment to indicate a maximum speed allowed in the respective road segment. In another example, a certain general driving assistance information rule may indicate that curve orientation points driving assistance markings should be included in each road segment comprising one or more curves exceeding a certain curve angle, for example, 10 degrees, 15 degrees, 25 degrees and/or the like.

However, the driving assistance information rules may also include one or more specific rules applicable for one or more specific road segments. For example, a certain specific driving assistance information rule may indicate that special driving assistance markings should be applied in the road segment in case the specific road segment includes a traffic circle immediately followed by another traffic circle within less than a certain distance, for example, 50 meters, 80 meters and/or the like. The special driving assistance markings which may be applied before the first circle may express the multiple traffic circles which may require some special attention by tone or more of the automatic vehicular control systems.

As shown at 106, the road markings engine 220 may analyze the image(s) of the road segment to identify and select one or more elements of the road segment which are suitable for applying (painting) the driving assistance markings generated for the road segment.

The elements on which the driving assistance markings may be painted nay include, for example, one or more surface sections of the road segment, one or more colored marks painted on the road segment, one or more infrastructure objects located in proximity to the road segment (e.g., next to, on, above, etc.) and/or the like. The colored marks painted on the road segment may include visible road markings such as, for example, lane separator markings, road side border line markings, pedestrian crossings, painted direction symbols (e.g., arrows, stop lines, etc.), painted text (e.g. stop, slow, etc.) and/or the like. The infrastructure objects may include, for example, pavement edges, traffic poles, traffic lights, structures wall and/or the like.

Figure 3A:
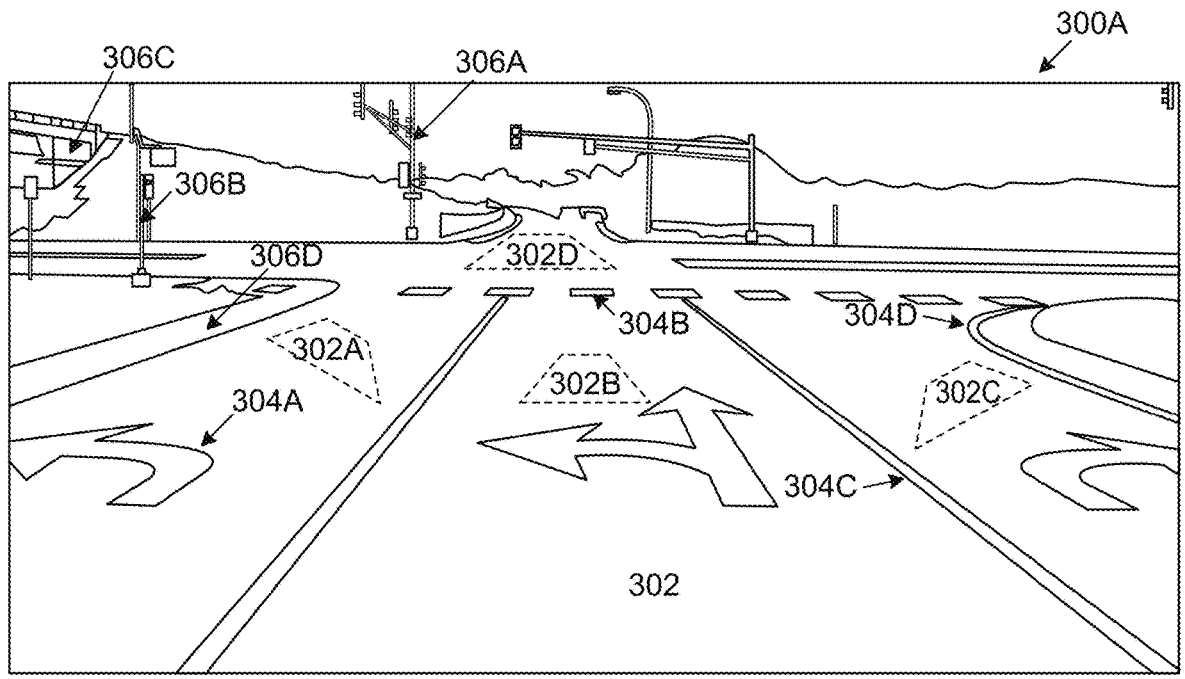
FIG. 3A and FIG. 3B are exemplary road segments comprising elements suitable for painting driving assistance marking painted using paint material(s) visible in the infrared spectrum while imperceptible in the visible light spectrum, according to some embodiments of the present invention.
Figure 3B:
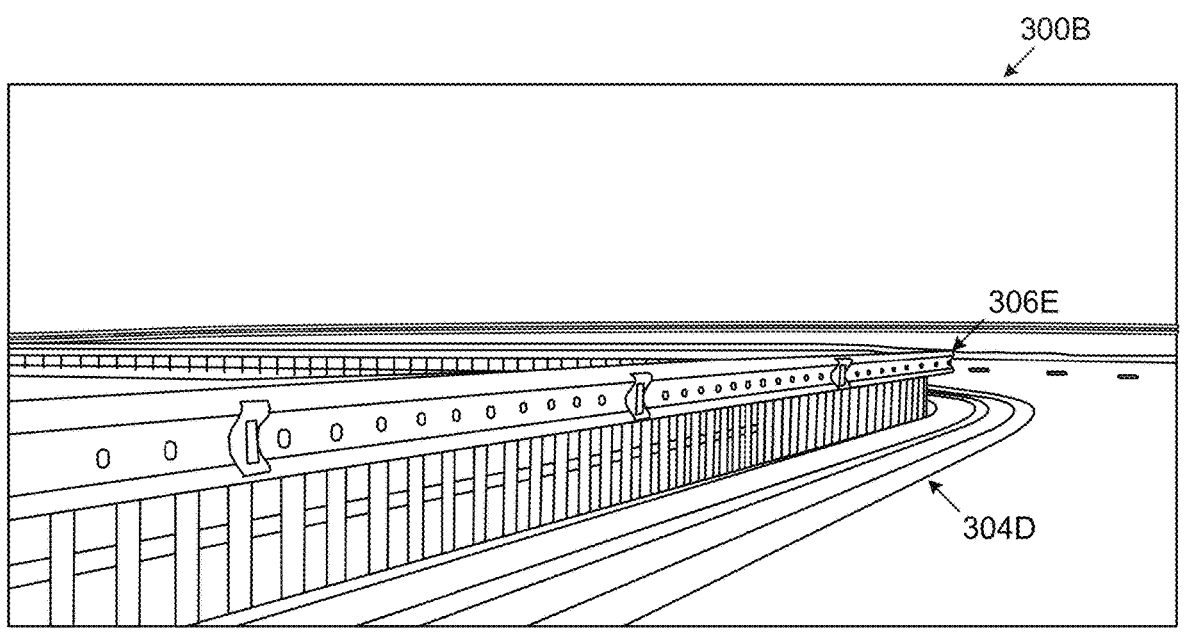

Reference is now made to FIG. 3A and FIG. 3B, which are exemplary road segments comprising elements suitable for painting driving assistance markings painted using paint material(s) visible in the infrared spectrum while imperceptible in the visible light spectrum, according to some embodiments of the present invention.

An exemplary road segment 300A may comprise a plurality of elements which may be identified by a road markings engine such as the road markings engine 220 as suitable for applying (painting) the driving assistance markings generated for the road segment. For example, the road markings engine 220 analyzing one or more images of the road segment 300A may identify one or more surface sections 302 of the road segment 300A which may be suitable for painting the driving assistance markings, for example, surface section 302A, 302B, 302C and/or 302D. In another example, the road markings engine 220 analyzing one or more images of the road segment 300A may identify one or more visible road markings 304 painted in the road segment 300A which may be suitable for painting the driving assistance markings, for example, an arrow marking 304A, a pedestrian crossing marking 304B a lane separator line 304C and and/or a road border line 302D. In another example, the road markings engine 220 analyzing one or more images of the road segment 300A may identify one or more infrastructure object 306 of the road segment 300A which may be suitable for painting the driving assistance markings, for example, a traffic light pole 306A, a lighting pole 306B, a wall of a bridge 306C and/or a sidewalk surface 306D.

An exemplary road segment 300B may also comprise a plurality of elements which may be identified by the road markings engine 220 as suitable for applying (painting) the driving assistance markings generated for the road segment. For example, the road markings engine 220 analyzing one or more images of the road segment 300B may identify one or more visible road markings 304 painted in the road segment 300B which may be suitable for painting the driving assistance markings, for example, a road border line 302D. In another example, the road markings engine 220 analyzing one or more images of the road segment 300B may identify one or more infrastructure object 306 of the road segment 30BA which may be suitable for painting the driving assistance markings, for example, a side barrier rail 306E.

The road markings engine 220 may therefore analyze the image(s) to identify one or more elements in the road segments which may be suitable for painting the generated driving assistance markings. In particular, the road markings engine 220 may select one or more of the identified elements according to the generated driving assistance markings.

For example, assuming the road segment comprises a pedestrian crossing and the road markings engine 220 generated driving assistance markings accordingly to indicate the presence of the pedestrian crossing and further indicate a distance to the pedestrian crossing. In such case, the road markings engine 220 may select one or more visible road markings, for example, lane separator lines for applying (painting) the driving assistance markings. In particular, the road markings engine 220 may select one or more lane separator lines and/or line sections which are located at the distance from the pedestrian crossing as indicated by the respective driving assistance markings. For example, assuming three driving assistance markings are generated to indicate the pedestrian crossing is 10, 30 and 50 meters ahead. In such case, the road markings engine 220 may select three lane separator lines and/or line sections located at 10, 30 and 50 meters before the pedestrian crossing on which the respective driving assistance markings may be painted.

In another example, assuming the road segment comprises a junction and the road markings engine 220 generated driving assistance markings accordingly to indicate the presence of the junction. In such case, the road markings engine 220 may select one or more road surfaces of the road segment for applying (painting) the driving assistance markings indicating the upcoming junction. For example, the road markings engine 220 may select a plurality of consecutive surface sections of the road segment for painting decrementing distance values to the junction.

In another example, assuming the road segment comprises a railroad intersection and the road markings engine 220 generated driving assistance markings accordingly to indicate the presence of the railroad intersection. In such case, the road markings engine 220 may select one or more infrastructure objects, for example, a slowdown traffic sign pole for applying (painting) the driving assistance markings indicating the upcoming railroad intersection.

Moreover, the road markings engine 220 may adjust one or more of the driving assistance markings according to the selected element(s) on which the driving assistance markings generated for the road segment are to be painted. For example, assuming the road markings engine 220 selects a traffic pole located 45 meters before an intersection for painting driving assistance markings indicative of the intersection, the road markings engine 220 may adjust and/or generate the driving assistance markings which are to be applied on the traffic pole to indicate that the intersection is 45 meters ahead. In another example, assuming the road markings engine 220 selects a series of lighting poles distributed along a sharp curve for applying (paining) orientation points driving assistance markings to assist the automatic vehicular control systems to maneuver the vehicles along the curve. In such case, the road markings engine 220 may adjust the size of the orientation points to fit the lighting poles while ensuring high visibility of the orientation points.

As shown at 108, the road markings engine 220 may analyze one or more of the surfaces of one or more of the selected element(s) on which the driving assistance markings generated for the road segment are to be painted. In particular, the road markings engine 220 may analyze the image(s) of the road segment to identify a color of the surface(s) of the selected element(s) and more specifically to identify the spectral range of visible light reflected by the surface(s) of the selected element(s).

For example, assuming the road markings engine 220 selects a certain road surface section of the road segment for applying the driving assistance markings, the road markings engine 220 may identify that the road surface section is a black asphalt surface which accordingly reflects visible light in a spectral range corresponding to black color. In another example, assuming the road markings engine 220 selects a certain road marking of the road segment for applying the driving assistance markings, the road markings engine 220 may identify that the road marking is painted white and thus reflects visible light in a spectral range corresponding to white color. In another example, assuming the road markings engine 220 selects a certain traffic pole of the road segment for applying the driving assistance markings, the road markings engine 220 may identify that the traffic pole is painted and/or coated with gray paint and thus reflects visible light in a spectral range corresponding to gray color.

As shown at 110, the road markings engine 220 may select one or more paint materials for applying (painting) the driving assistance markings generated for the road segment on the selected element(s) of the road segment.

Specifically, the road markings engine 220 may select infrared reflective paint material(s) which reflect infrared light in one or more infrared spectral ranges, for example, NIR (700-1400 nm), SWIR (1400-3000 nm) and/or the like and are further characterized by two main characteristics.

First, each of the selected paint materials may reflect light in the visible light spectral range which is substantially similar to the visible light spectral range of the surface(s) of the selected object(s) on which the driving assistance markings are to be applied. Specifically, each paint material selected for painting the driving assistance markings may deviate by less than a first value from the visible light spectral range reflected by the respective surface of the respective element. The first value, for example, 15%, 20%, 25% and/or the like may be set to ensure that the selected paint material(s) is not substantially visible in the visible light spectrum when painted on the selected element(s).

Second, each of the selected paint materials may reflect light in the infrared spectral range which is substantially different from the infrared spectral range of the surface(s) of the selected object(s) on which the driving assistance markings are to be applied. Specifically, each paint material selected for painting the driving assistance markings should deviate by more than a second value from the infrared spectral range reflected by the respective surface of the respective element. The second value, for example, 25%, 30%, 35% and/or the like may be set to ensure that the selected paint material(s) is substantially visible in the infrared light spectrum when painted on the selected element(s).

For brevity the paint material(s) selected for painting the driving assistance markings are designated infrared reflective paint materials. However, the deviation in the reflectance of infrared light may be to both directions, meaning that the paint material(s) selected for painting the driving assistance markings may be more infrared reflective or more absorptive compared to the surrounding background of the markings, i.e., the surface of the selected element(s) on which the markings are painted. As such, when the selected infrared reflective paint material(s) is more infrared reflective, the driving assistance markings will reflect more infrared light compared to their surrounding background and will be thus visible in the infrared spectrum range. Never the less, when the selected infrared reflective paint material(s) is more infrared absorptive (less infrared reflective), the driving assistance markings will reflect less infrared light compared to their surrounding background and will be also visible in the infrared spectrum range.

For example, assuming the road markings engine 220 selects a certain black asphalt road surface section of the road segment for applying the driving assistance markings. Further assuming that while the black asphalt road surface does not significantly reflect light in the visible light spectral range, the black asphalt road surface reflects infrared light in a spectral range of, for example, less than 800 nm. In such case the road markings engine 220 may select a paint material which does not deviate from the black asphalt color by more than, for example, 20% meaning that it does not reflect more than 20% of the visible light while significantly deviating, for example, by 25% from black asphalt color in the infrared spectral range, meaning that it reflects infrared light in a range of more than 1000 nm for example.

In another example, assuming the road markings engine 220 selects a certain white road marking of the road segment for applying the driving assistance markings. Further assuming that while the white road marking reflects most and possible all light in the visible light spectral range, the white road marking reflects infrared light in a spectral range of, for example, less than 950 nm. In such case the road markings engine 220 may select a paint material which does not deviate from the white road marking by more than, for example, 20% meaning that it reflects more that 80% of the visible light while significantly deviating, for example, by 25% from white road marking in the infrared spectral range, meaning that it reflects infrared light in a range of more than 1200 nm for example.

Figure 4:
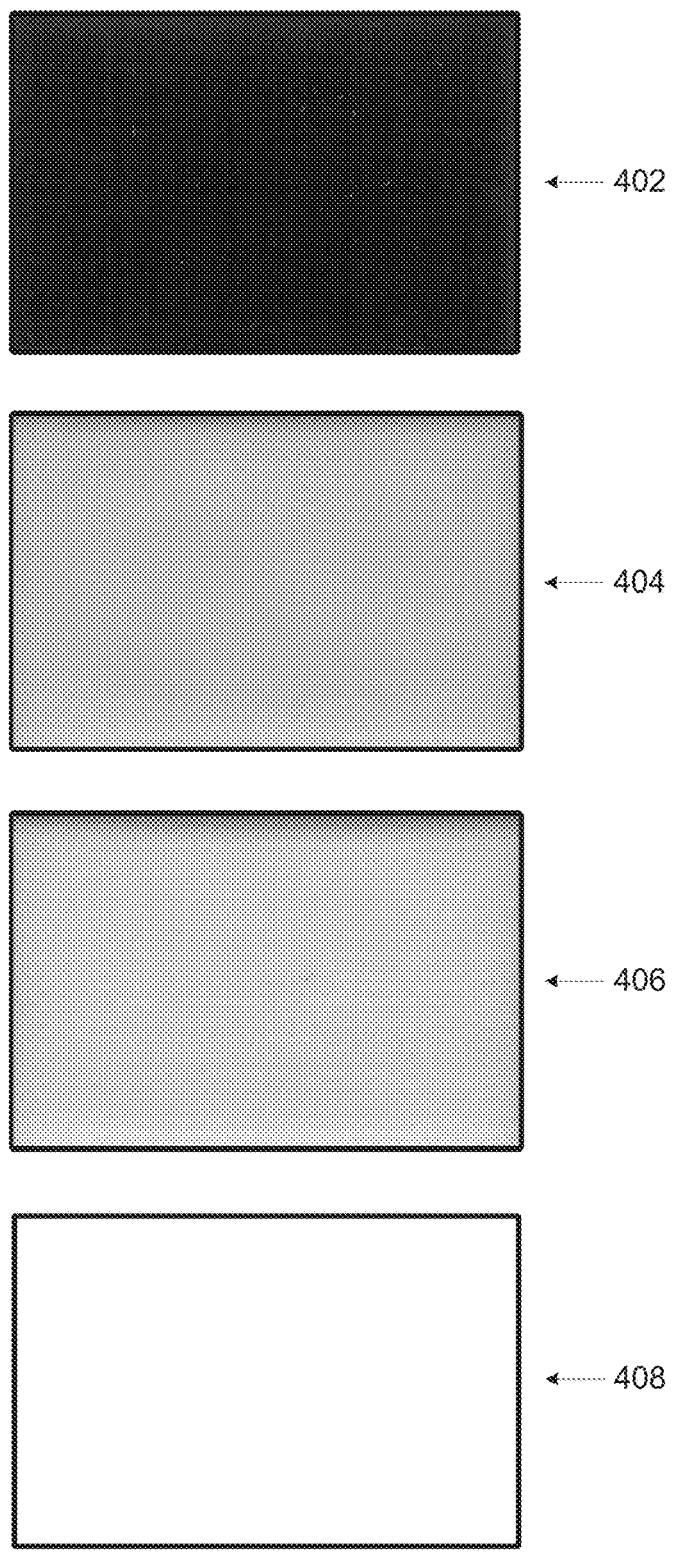
FIG. 4 presents color blends of an exemplary infrared reflective paint material(s) visible in the infrared spectrum while imperceptible in the visible light spectrum used for painting imperceptible driving assistance markings, according to some embodiments of the present invention.

Reference is now made to FIG. 4, presents color blends (mixtures) of an exemplary infrared reflective paint material(s) visible in the infrared spectrum while imperceptible in the visible light spectrum used for painting driving assistance markings, according to some embodiments of the present invention.

Assuming a road markings engine such as the road markings engine 220 selects a certain infrared reflective paint material seen in 402 which is characterized by a significantly dark color for painting driving assistance markings generated for a certain road segment. Further assuming the road markings engine 220 selects to paint the driving assistance markings on a certain element of the certain road segment which is characterized by a white color as seen in 408. In such case, the road markings engine 220 may determine that the certain infrared reflective paint material should be mixed with one or more other paint materials, for example, a white paint material to ensure that the certain infrared reflective paint material does not deviate from the color of the certain element painted white by more than the first value (e.g., 20%). The road markings engine 220 may compute one or more mixture ratios for mixing the certain infrared reflective paint material such that the color of the mixed infrared reflective paint material does not deviate by more than the first value form the white color of the surface of the certain element. A mixture at a ratio of 1:4 between the certain infrared reflective paint material and the white paint material is seen in 404 and a mixture at a ratio of 1:9 between the certain infrared reflective paint material and the white paint material is seen in 406.

As shown at 112, the road markings engine 220 may compute instructions for painting the driving assistance markings generated for the road segment on the selected element(s) using the selected paint material(s).

For example, the painting instructions may indicate a location, a position, an orientation, an elevation and/or the like for painting the driving assistance markings on the selected element(s). In another example, the painting instructions may indicate a size, a spacing and/or the like of the painted driving assistance markings.

Moreover, the painting instructions may define mixing one or more of the selected inferred reflective paint materials with one or more other paint materials and/or dilution substances to achieve and comply with the two characteristics of the paint material used to paint the driving assistance markings. Namely, these two characteristics, as described herein before, are deviation of less than the first value (e.g., 20%) from the visible light spectral range reflected by the surface of the respective element and deviation of more than the second value (e.g., 25%) from the infrared spectral range reflected by the surface of the respective element. The painting instructions may therefore define a concentration of each of the paint materials in the mixture, a volume of each paint materials in the mixture, one or more dilution materials and/or the like.

Optionally, the road markings engine 220 computes instructions for painting one or more of the driving assistance markings on the selected element(s) in close proximity, specifically closely around one or more visible road markings, for example, lane separator markings, road side border line markings, pedestrian crossings, painted direction symbols (e.g., arrows, stop lines, etc.), painted text (e.g. stop, slow, etc.) and/or the like. For example, the road markings engine 220 may compute instructions for painting one or more of the driving assistance markings next to lane separator lines markings. In another example, the road markings engine 220 may compute instructions for painting one or more of the driving assistance markings around one or more direction arrow markings. Painting the infrared visible driving assistance markings in proximity to the visible road markings may enable the automated vehicular systems to more easily detect, identify and/or recognize the infrared visible driving assistance markings. In particular, since the infrared visible driving assistance markings are located in proximity to the visible road markings, the automated vehicular systems may not erroneously interpret arbitrary infrared reflective materials and/or sections of the road segment as the infrared visible driving assistance markings.

The road markings engine 220 may compute the instructions for painting the driving assistance markings using the infrared reflective paint material(s) on existing painted surfaces of the selected element(s) of the road segment. For example, assuming there are lane separator line markings painted in at least part of the road segment, the road markings engine 220 may compute the instructions for painting the driving assistance markings using the infrared reflective paint material(s) on the existing lane separator line markings and/or part thereof. In another example, assuming there are one or more painted traffic poles and/or traffic light poles in the road segment, the road markings engine 220 may compute the instructions for painting the driving assistance markings using the infrared reflective paint material(s) on one or more of the painted poles.

However, the road markings engine 220 may compute the instructions for painting the driving assistance markings using the infrared reflective paint material(s) in conjunction with one or more other paint materials used to paint the surface(s) of the selected element(s). For example, the road markings engine 220 may compute instructions for painting one or more visible road markings, for example, lane operator lines, pedestrian crossing, direction symbols and/or the like using one or more visible light paint materials, for example, white paint. The road markings engine 220 may further compute instructions for using the infrared reflective paint material(s) to paint the driving assistance markings over one or more of the newly painted white road markings. In another example, the road markings engine 220 may compute instructions for painting one or more traffic poles located in the road segment using one or more visible light paint materials, for example, gray paint. The road markings engine 220 may further compute instructions for using the infrared reflective paint material(s) to paint the driving assistance markings over the one or more of the newly painted poles.

As shown at 114, the road markings engine 220 may output the painting instructions computed for painting the driving assistance markings on one or more of the elements of the road segment using one or more of the infrared visible paint materials The road markings engine 220 may output the painting instructions in one or more formats. For example, the painting instructions may be generated and configured accordingly to instruct one or more workers to manually apply the infrared visible paint(s). in another example, the painting instructions may be directed and configured accordingly for one or more automated painting systems, apparatuses and/or devices configured to apply automatically the infrared visible paint(s) to paint.

Figure 5:
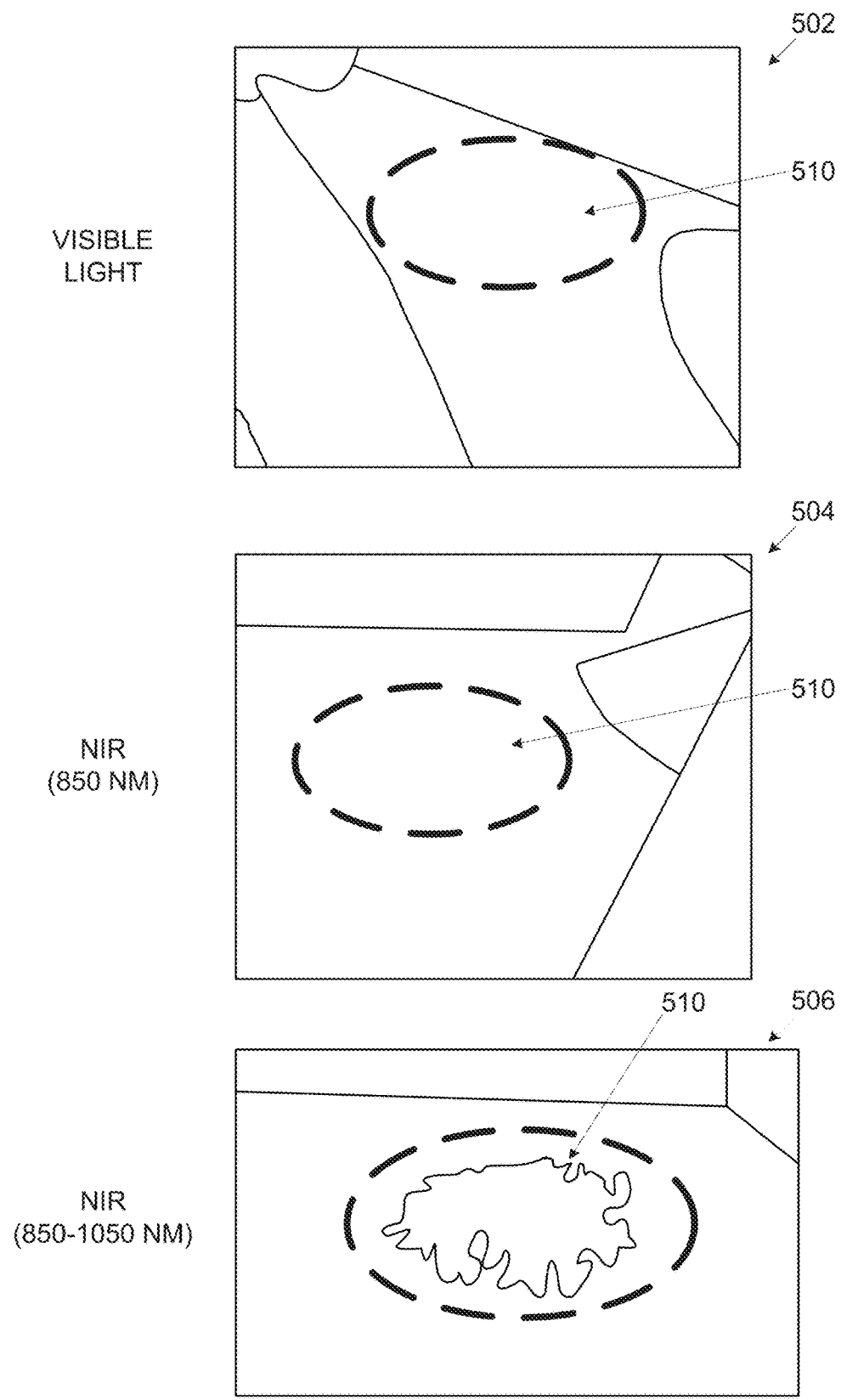
FIG. 5 presents images of a road section painted with an exemplary paint material(s) visible in the infrared spectrum while imperceptible in the visible light spectrum used for painting driving assistance markings, according to some embodiments of the present invention.

Reference is now made to FIG. 5, which presents images of a road section painted with an exemplary paint material(s) visible in the infrared spectrum while imperceptible in the visible light spectrum used for painting driving assistance markings, according to some embodiments of the present invention.

As seen in 502 which is an image of an exemplary certain road section captured in visible light spectral range, a certain mark 510 is almost imperceptible since it is painted using an exemplary infrared reflective paint material which does not significantly deviate from the color (visible light spectral range) of the certain road section.

As seen in 504, which is an image of the certain road section captured in NIR infrared spectral range, specifically at 850 nm, the certain mark 510 is slightly more visible since the exemplary infrared reflective paint material deviates to some extent from the infrared spectral range of the certain road section. However, the deviation may be insufficient, i.e., less than the second value (e.g. 25%) such that it may be significantly difficult to distinguish the certain mark 510 from its surrounding road section even in the 850 nm spectral range.

As seen in 506, which is an image of the certain road section captured in higher NIR infrared spectral range, specifically at 850-1050 nm, the certain mark 510 is highly visible since the exemplary infrared reflective paint material significantly deviates from the infrared spectral range of the certain road section, specifically by more than the second value (e.g. 25%).

According to some embodiments of the present invention the road markings generation system 200, specifically the road markings engine 220 may be integrated and/or executed by one or more painting systems, apparatuses and/or devices configured to apply automatically one or more of the infrared reflective paint materials for painting the infrared visible driving assistance markings on one or more elements in one or more road segments.

Such painting systems, apparatuses and/or devices, collectively designated automated painting systems herein after, may be equipped with one or more paint applying elements as known in the art, for example, a sprayer, a brush, a dispenser and/or the like which are controllable by one or more controllers and/or processors of the automated painting systems.

The road markings engine 220 executed by one or more of the automated painting systems may therefore execute the process 100 to compute the instructions for painting the driving assistance markings generated for one or more road segments on one or more elements of the respective road segments using one or more of the infrared reflective paint materials.

Specifically, one or more of the automated painting systems may be equipped with one or more imaging sensors, for example, a camera, infrared camera, a thermal camera and/or the like configured to capture one or more images of the road segment(s) in particular of one or more of the elements of the road segment(s). The road markings engine 220 may analyze the images, specifically the elements' surface(s) to identify their color and select the infrared reflective paint material(s) accordingly as described in the process 100.

After computing the painting instructions, the road markings engine 220 may operate one or more of the paint applying elements of the respective automated paining system to automatically apply the infrared reflective paint materials in order to paint the infrared visible driving assistance markings. In other embodiments, the road markings engine 220 may provide the painting instructions to one or more other functional modules (e.g. software module, hardware element and/or a combination thereof) executed by the automated painting system.

Optionally, one or more of the automated paining systems may be further configured to apply visible paint to paint road markings using one or more visible paint materials which are visible in the visible light spectrum. Such automated paining systems may optionally paint the infrared visible driving assistance markings using the selected infrared reflective paint material(s) while painting the visible road markings using the visible paint material(s).

According to some embodiments of the present invention, the road markings generation system 200, specifically the road markings engine 220 may be configured to compute instructions for painting tiles (patches) on a surface of one or more road segments which are highly visible in one or more infrared light spectral ranges while highly imperceptible in the visible light spectrum.

In particular, the alternating tiles may comprise alternating high reflective and low reflective infrared tiles may be used to express road markings, for example, include driving assistance markings which may significantly blend with their background, i.e. the road surface in the visible light range making them significantly imperceptible by the human eye and thus invisible to human drivers and/or visible light base automated systems.

The term tile (and tiles) as used herein is intended to describe a polygon shape, for example, a triangle, a quadrangle and/or the like. In particular, the tile may be shaped as a quadrangle, for example, a rectangle, a trapezoid and//or the like.

The road markings engine 220 may execute a process similar to the process 100 to paint the alternating tiles on the road surface of one or more road segments, for example, on a road edge. However, the road markings engine 220 may execute the process 100 with some adjustments. First, in step 104, the road markings engine 220 may compute driving assistance markings which may be expressed using the alternating tiles. Moreover, in step 106, the road markings engine 220 may select only road surfaces to paint the alternating infrared reflective tiles. Furthermore, in step 110, the road markings engine 220 may select multiple paint materials which reflect significantly different light levels in one or more of the infrared spectral ranges, for example, NIR, SWIR and/or the like while in the visible light spectral range they may reflect light which deviates by less than a certain value from the light reflected by the road surface.

As describe in the process 100, in step 102, the road markings engine 220 may receive one or more images of the road segment.

In step 104, the road markings engine 220 may generate road markings, for example, driving assistance markings for the road segment. In particular, the road markings engine 220 may generate a pattern, scheme and/or design of alternating tiles comprising alternating high infrared reflective tiles and low infrared reflective tiles which to express road markings, for example, driving assistance markings using one or more methods, implementations and/or applications.

The alternating tiles themselves may express road markings, for example, by their location, position, shape, dimensions and/or the like. For example, through their position on the road surface, the alternating infrared reflective tiles may indicate an edge of the road, indicate a road shoulder, indicate a lane separator and/or the like. In another example, in some modern road infrastructure white and/or yellow lane markers indicating lane separators are surrounded by black colored frames to enhance visibility of the lane markers in the visible light spectrum, for both human drivers and automated vehicular system configured to operate in the visible light spectral range. However, the surrounding black marker frames may be painted to comprise the alternating infrared reflective tiles which may be detected by automated vehicular system configured to operate in the infrared spectral range to further indicate the lane separator.

Figure 6:
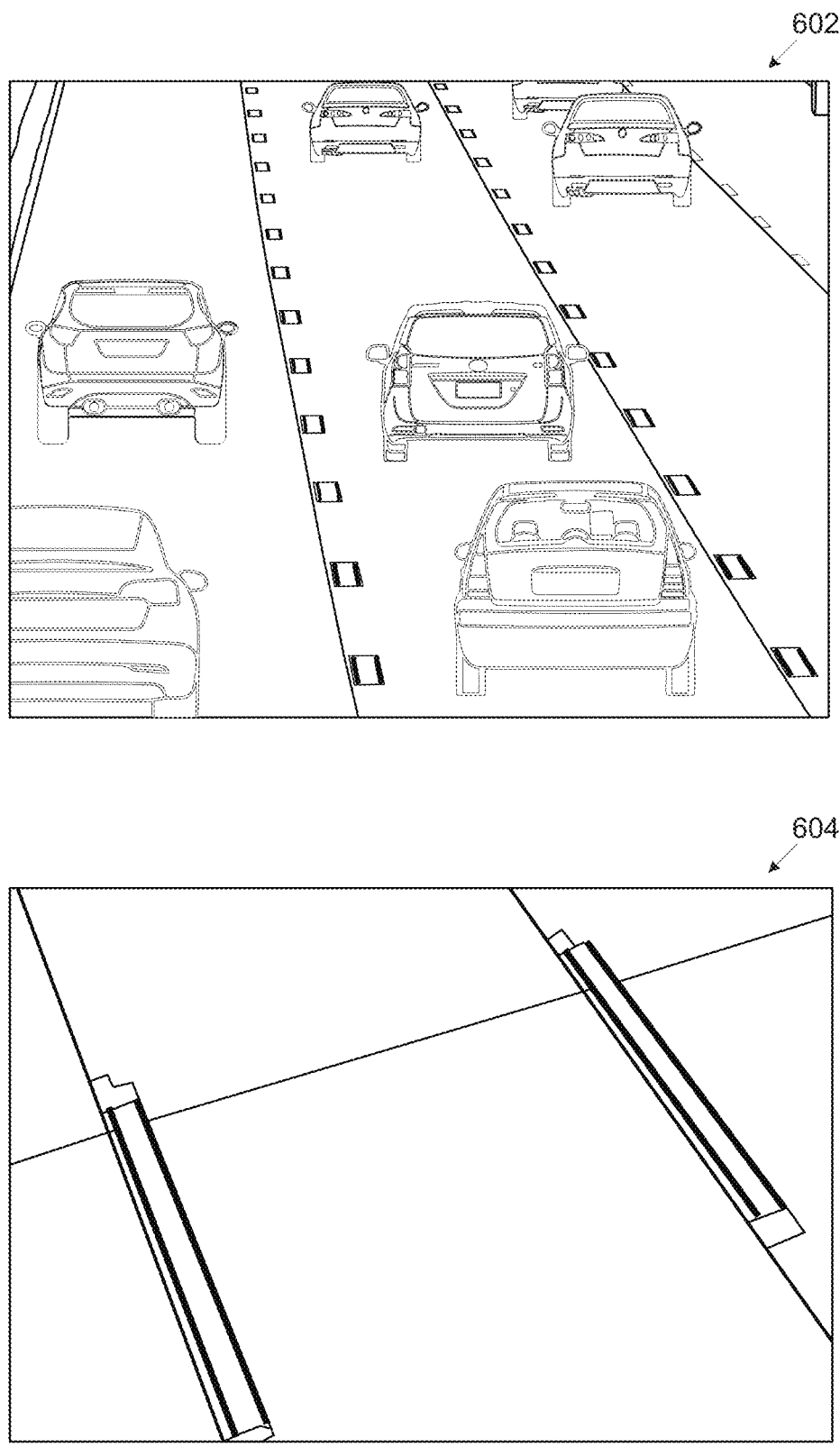
FIG. 6 illustrates line separators marked by lane markers surrounded by black colored frames.
Figure 7A:
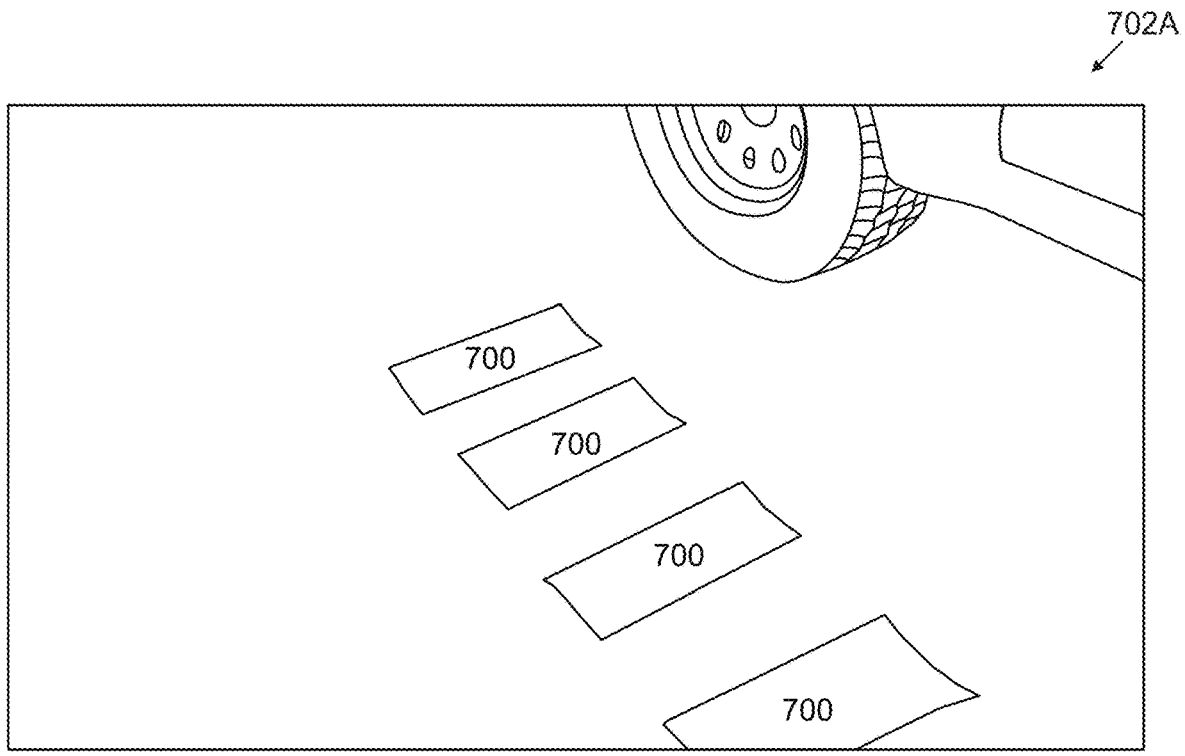
FIG. 7A, FIG. 7B, FIG. 7C, FIG. 7D, FIG. 7E and FIG. 7F present images of alternating infrared reflective tiles used to express road markings, according to some embodiments of the present invention.
Figure 7A:
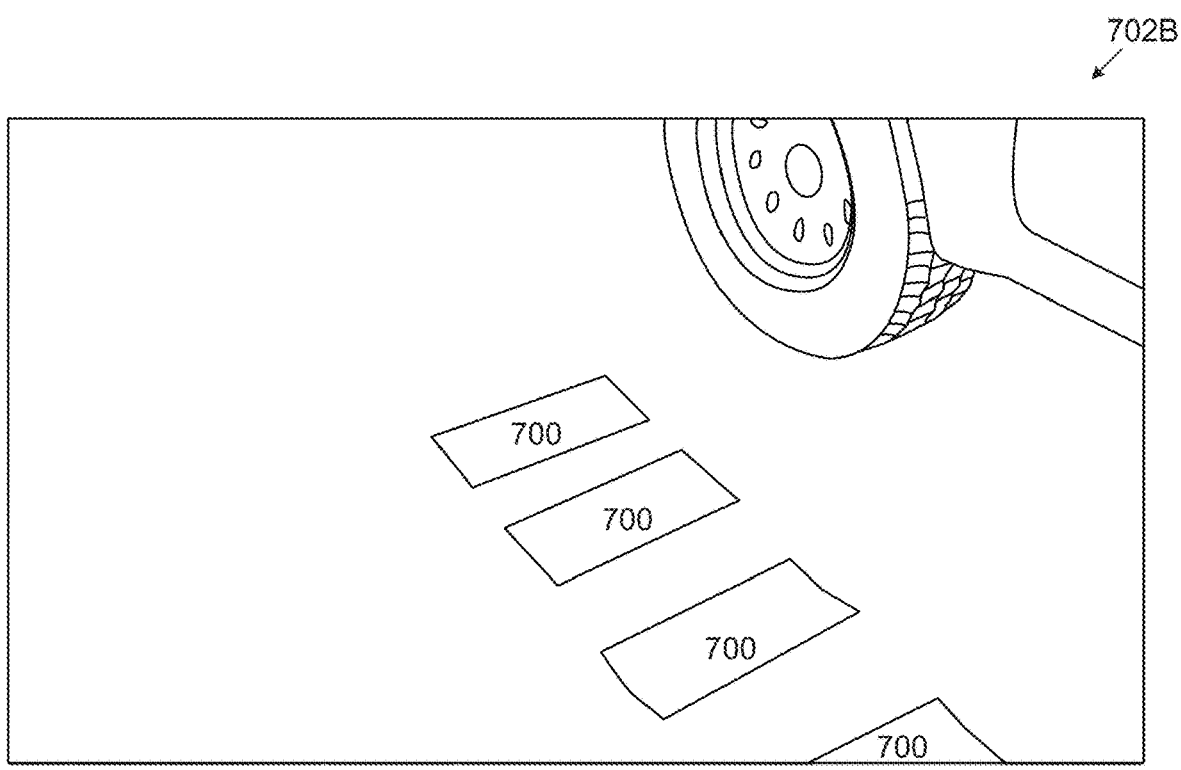
Figure 7B:
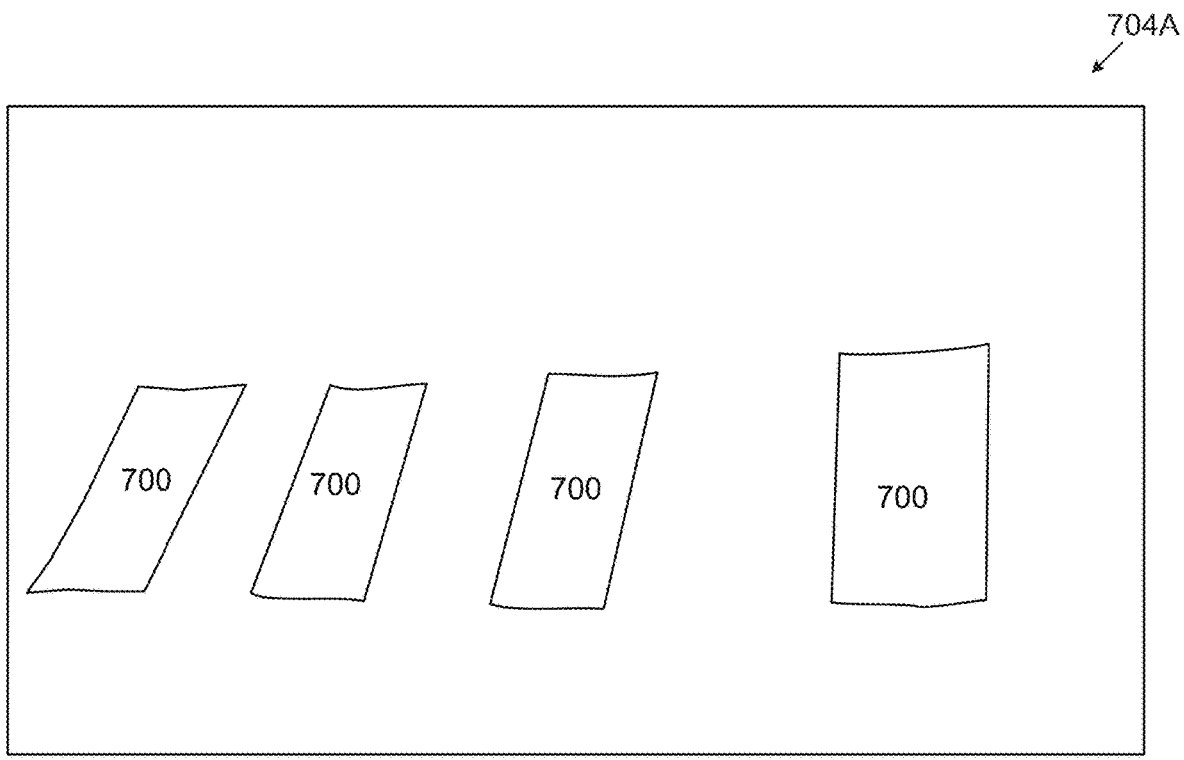
Figure 7B:
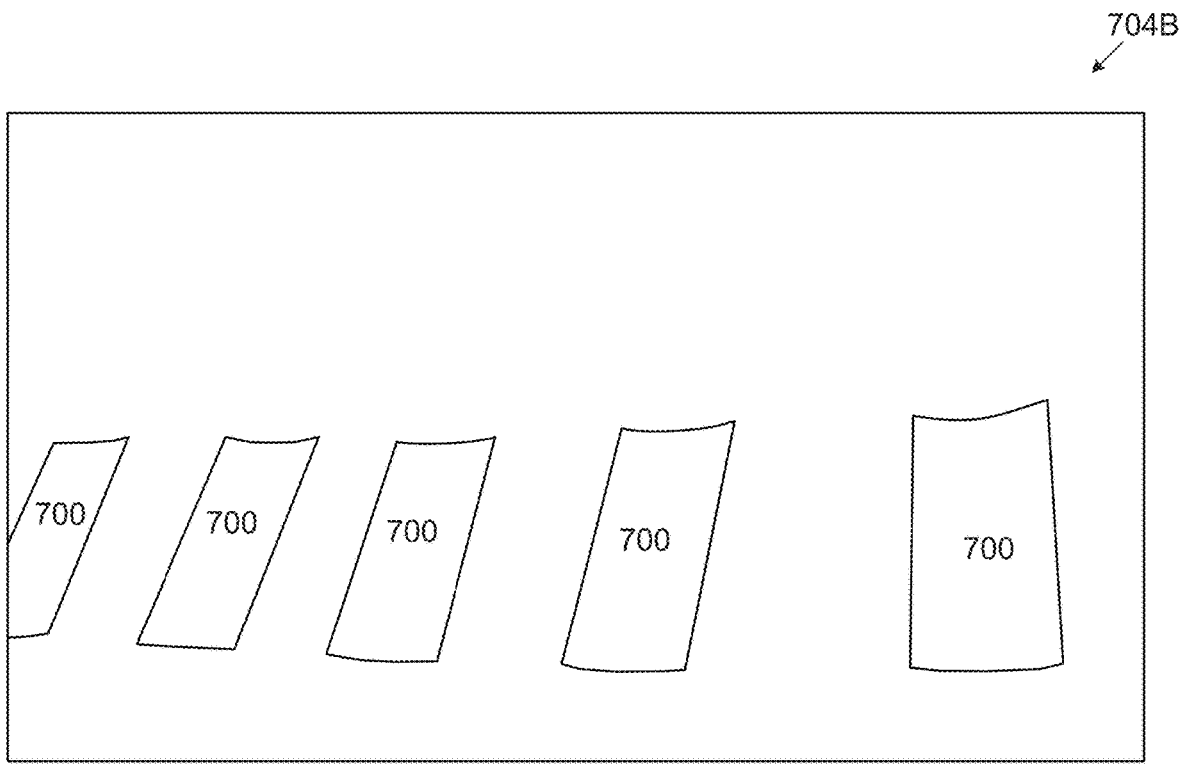
Figure 7C:
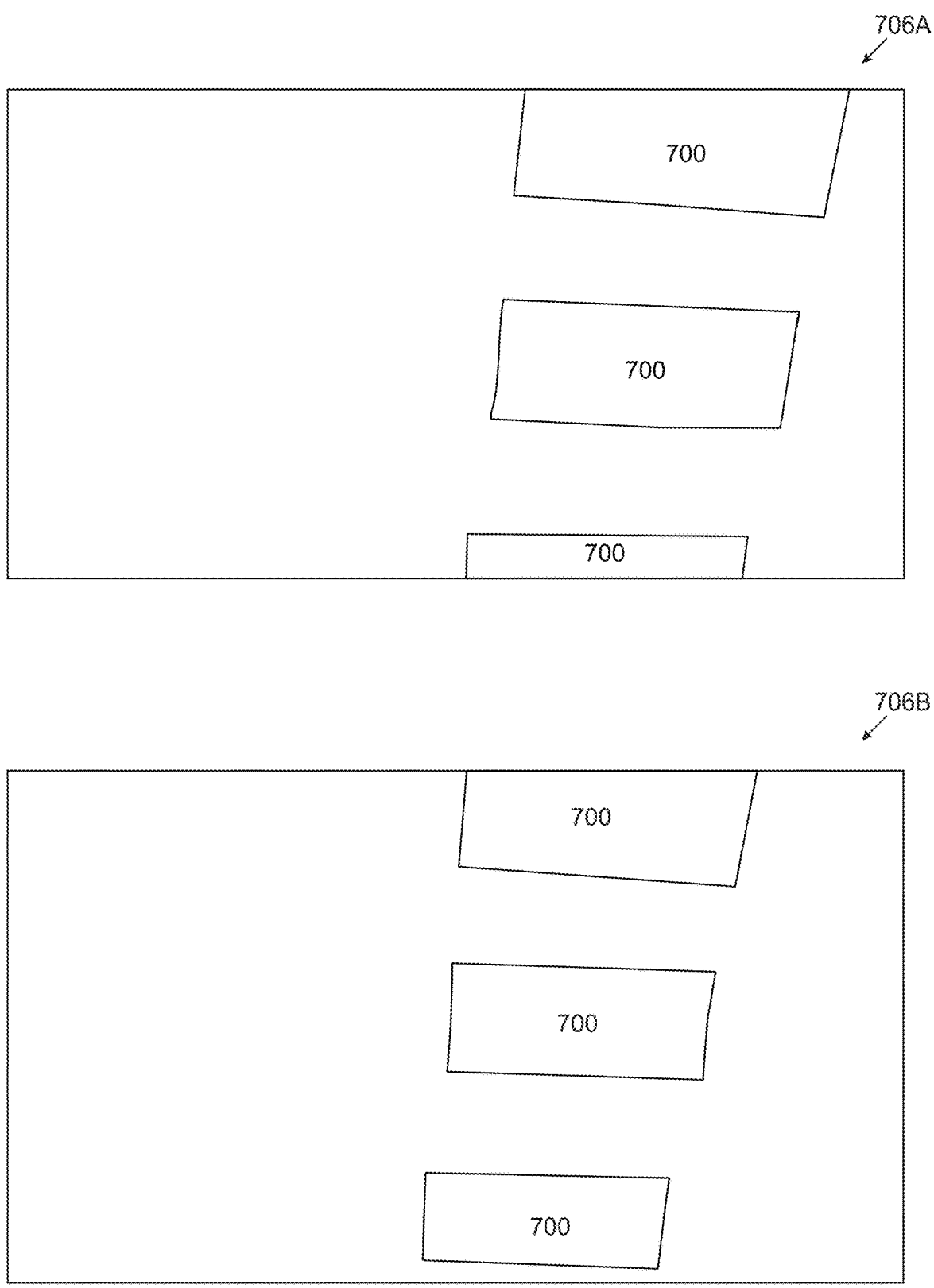
Figure 7D:
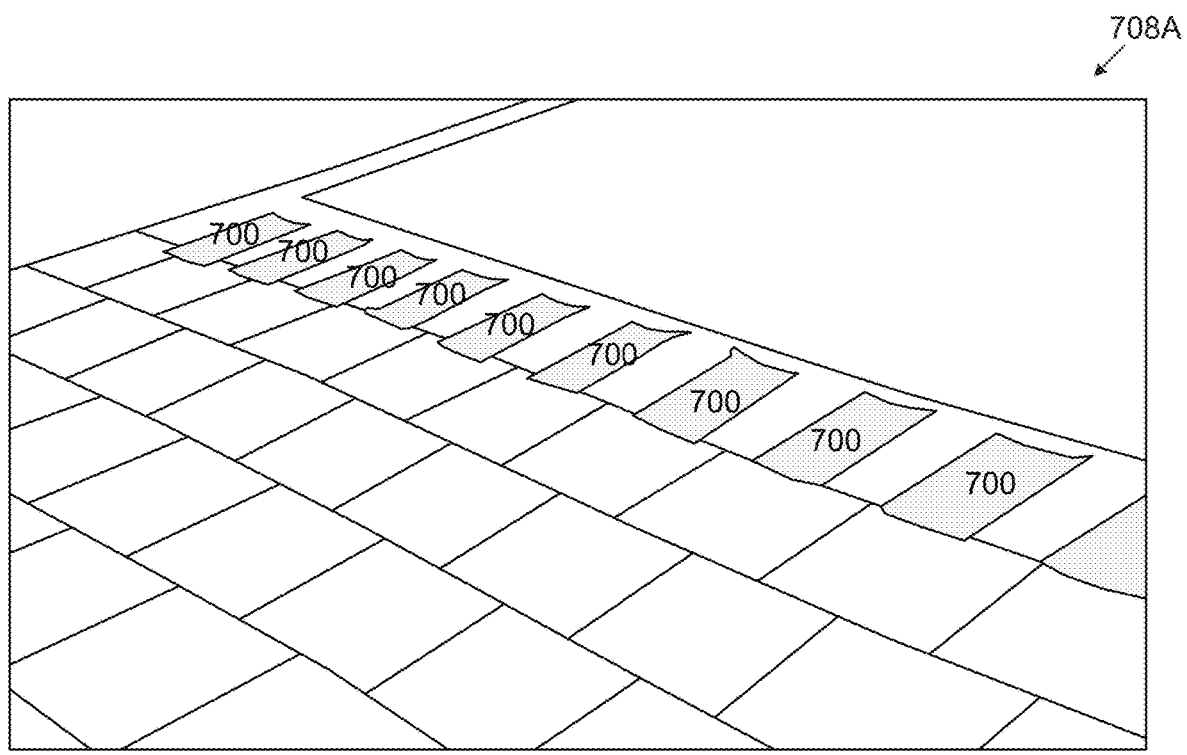
Figure 7D:
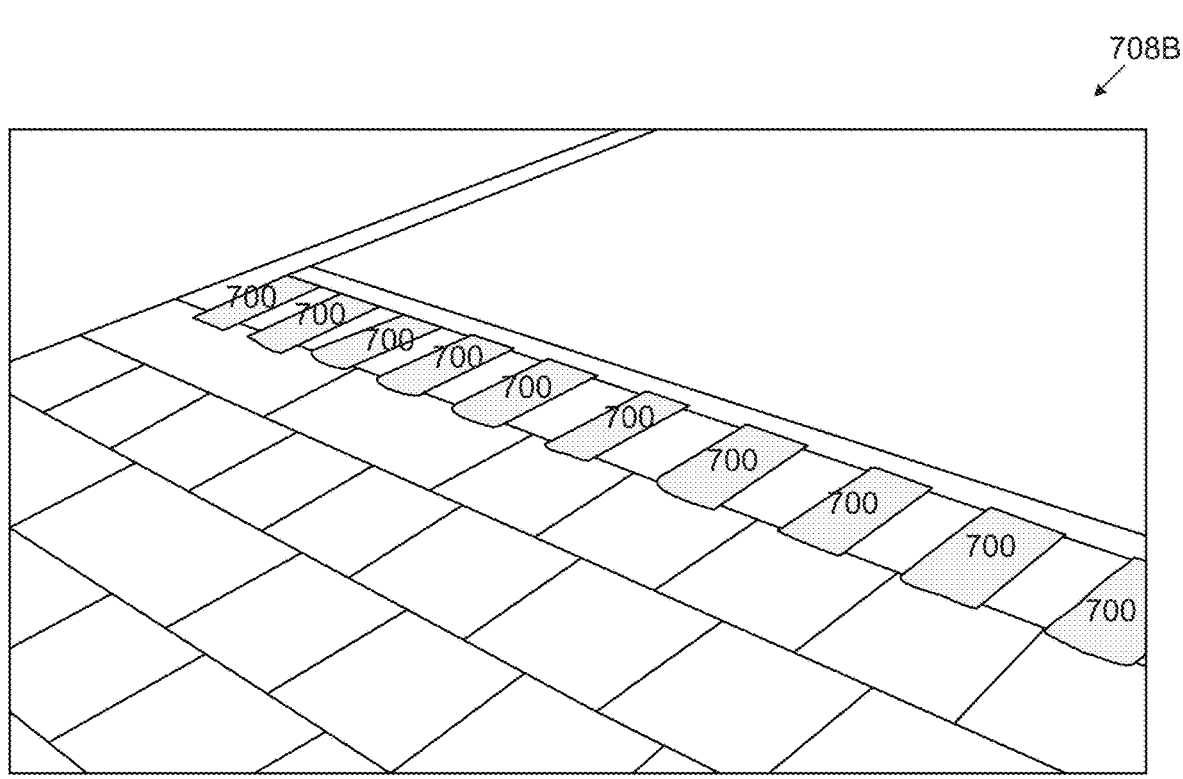
Figure 7E:
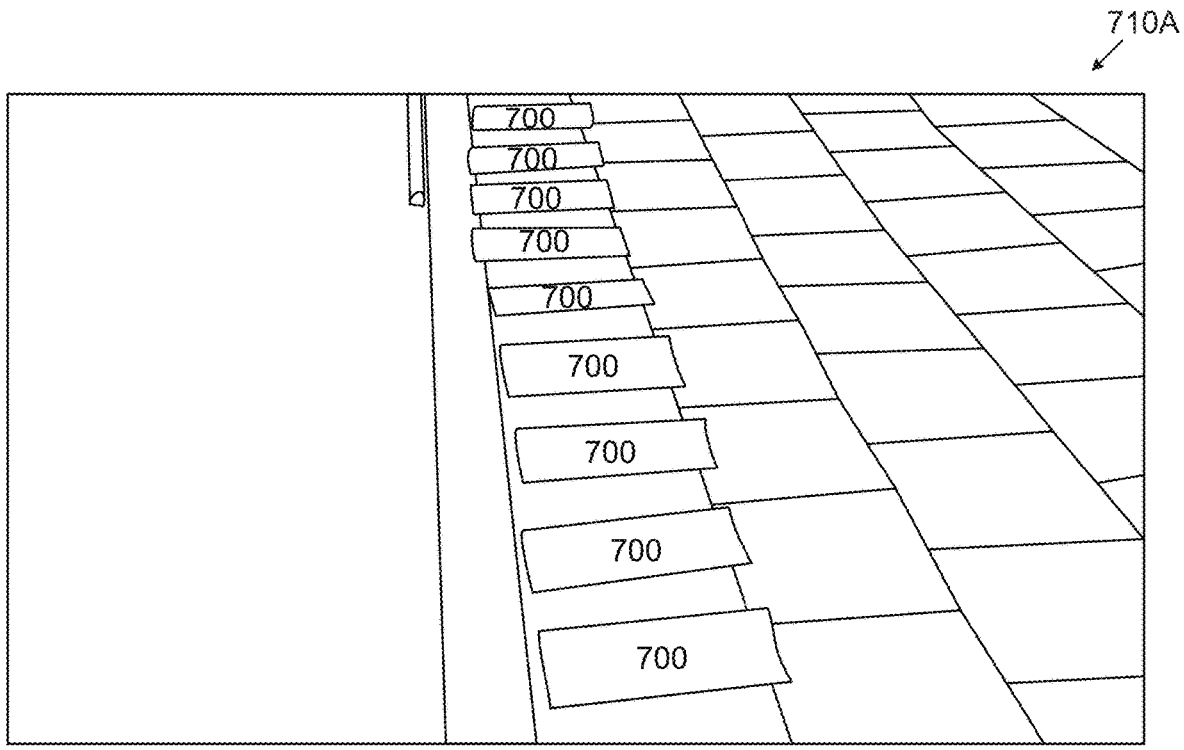
Figure 7E:
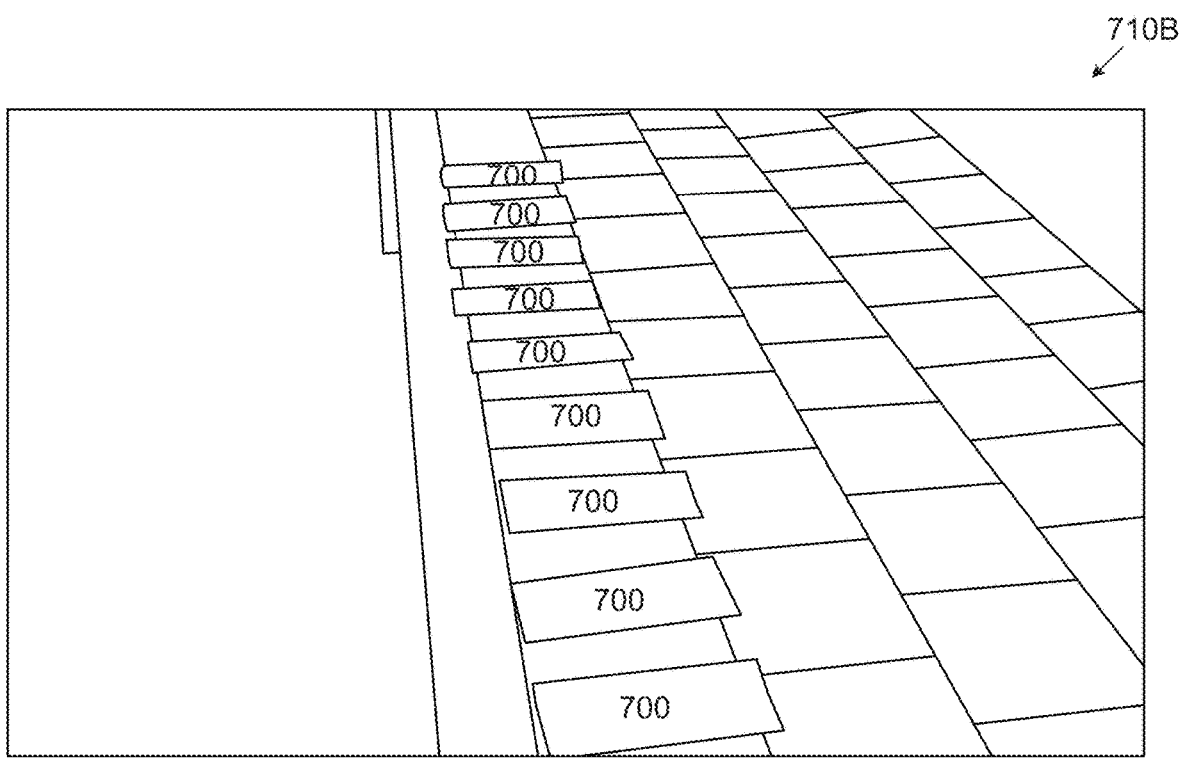
Figure 7F:
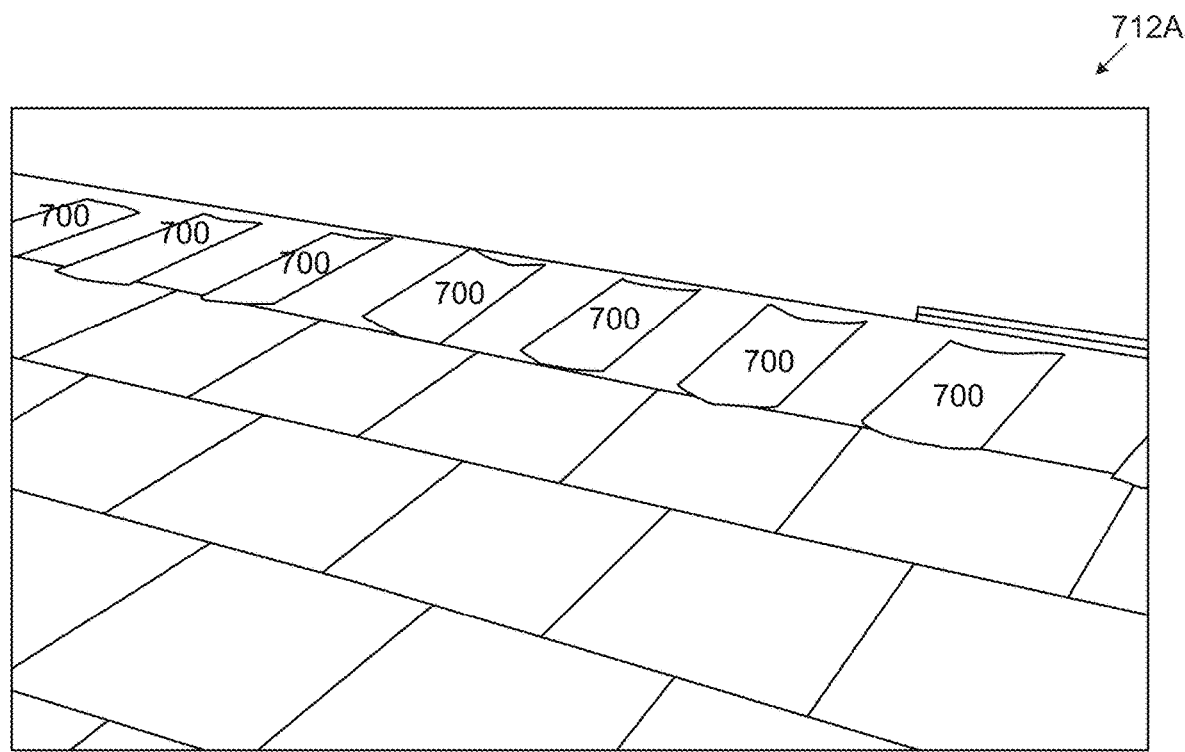
Figure 7F:
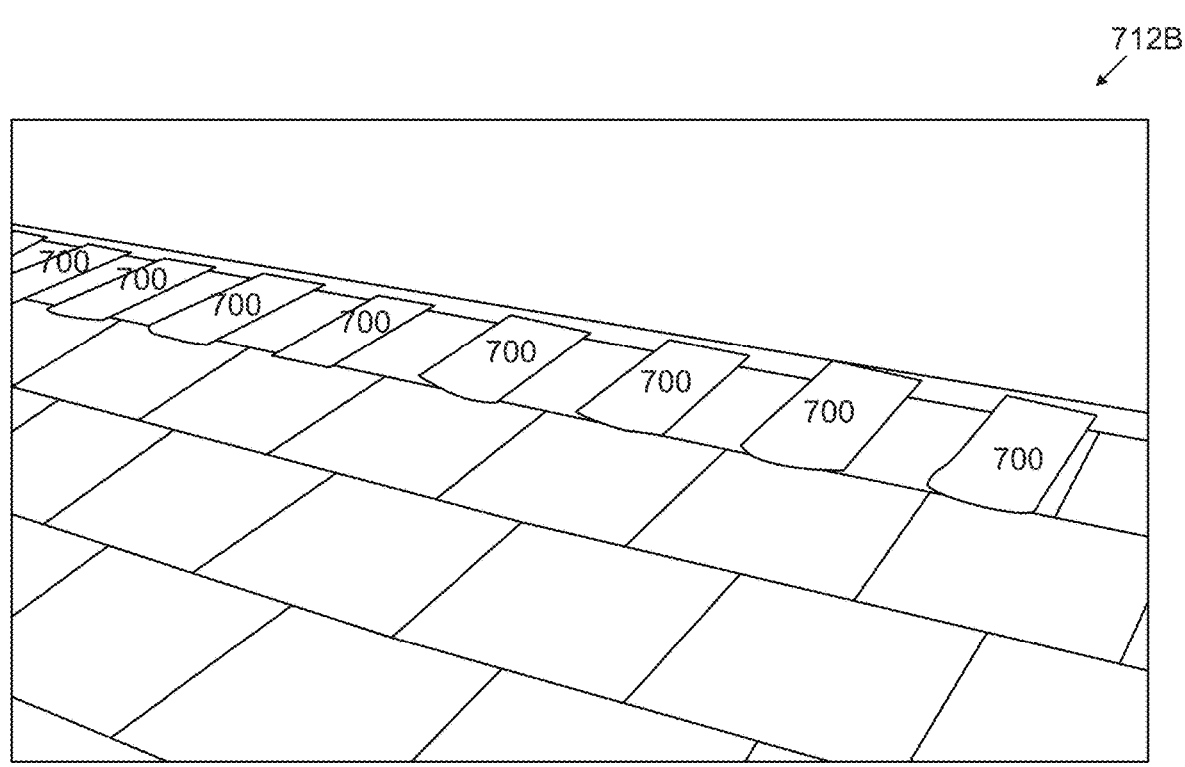

Reference is now made to FIG. 6, which illustrates line separators marked by lane markers surrounded by black colored frames. Image 602 depicts an exemplary road infrastructure in which line separators are marked with light color dashed markers which are each surrounded at least partially, for example, at the long edges of the markers by black frames. Image 604 shows the lines separator markers surrounded by black colored frames at the long edges of the markers.

As described herein before, while in the visible light spectral range the black frames may be seen and/or perceived as black frames and thus preventing overload of human drivers' perception, in the infrared spectral range(s) these dark colored frames may include the alternating infrared reflective tiles painted using one or more of the infrared reflective paint material. The alternating infrared reflective tiles may be therefore detectable (visible) and used by automated vehicular systems adapted to operate in the infrared spectral range(s).

In another example, one or more dimensions of the alternating tiles, for example, a width and/or a length may be used to encode the road markings, specifically the driving assistance markings. For example, a right curve may be indicated and/or expressed by alternating tiles which are gradually narrowing towards the middle of the curve and widening back to their nominal width while exiting the curve, for example, having a reduced and then increased width, having a smaller and then larger gap between tiles and/or the like. In another example, a left curve may be indicated and/or expressed by alternating tiles which are gradually widening towards the middle of the curve and narrowing back to their nominal width while exiting the curve, for example, having an increased and then reduced width, having a larger and then smaller gap between tiles and/or the like.

However, rather than explicitly encoding the road markings, the alternating tiles may be used as a reference, an indicator, a marker, a frame and/or the like for the road markings encoded on the road surface, for example, location, warnings, traffic signs and/or the like. For example, the road markings may be painted between the alternating tiles, above the alternating tiles, below the alternating tiles and/or the like. The alternating tiles may therefore serve as a reference point, a positioning point, a frame, a marker and/or the like for the road markings.

As described herein before, the road markings expressed using the alternating infrared reflective tiles may express driving information relating to the road segment which may include descriptive information relating to one or more transportation infrastructure objects located in the road segment as identified by analyzing the image(s). Also as described herein before, the road markings expressed using the alternating infrared reflective tiles may further express driving information directed to assist one or more of the automatic vehicular control systems of one or more vehicles to conduct one or more control operations to control the vehicle.

In step 106, the road markings engine 220 may analyze the image(s) of the road segment to identify and select one or more road sections and/or regions of the road segment for applying (painting) the alternating infrared reflective tiles.

In step 108, the road markings engine 220 may analyze the road surface of one or more of the selected sections and/or regions on which the alternating infrared reflective tiles generated for the road segment are to be painted. In particular, the road markings engine 220 may analyze the image(s) of the road segment to identify a color of the road surface(s) and more specifically to identify the spectral range of visible light reflected by the road surface(s), for example, visible light corresponding to black color, gray color, grayscale color and/or the like.

In step 110, the road markings engine 220 may select one or more paint materials for applying (painting) the alternating infrared reflective tiles generated for the road segment on the road surface of the selected sections and/or regions of the road segment.

The alternating infrared reflective tiles and the road markings are directed to support one or more of the automated vehicular systems which are capable of operating in the infrared spectrum, in particular, automated vehicular systems which integrate, employ, connect and/or communicate with one or more imaging sensors adapted to operate in the infrared spectral range, for example, NIR, SWIR and/or the like.

The road markings engine 220 may therefore select, for painting the alternating infrared reflective tiles, paint materials which reflect (or absorb) infrared light in one or more infrared spectral ranges, for example, NIR, SWIR and/or the like. However, while the selected paint materials are characterized by reflecting and/or absorbing significant light in the infrared light spectral range(s), these paint materials are also characterized by reflecting light, in visible light spectral range, which is substantially similar to the light reflected by the road surface.

In the visible light range, the paint materials selected for painting the alternating infrared reflective tiles may therefore reflect light deviating by less than a first value from the visible light spectral range reflected by the road surface of the respective road section and/or region selected for paining the alternating infrared reflective tiles. The first value, for example, 15%, 20%, 25% and/or the like may be set to ensure that the selected paint materials are substantially imperceptible (visible) in the visible light spectrum when painted on the selected element(s).

In addition, the paint materials selected for painting the alternating infrared reflective tiles may reflect light in one or more of the infrared spectral ranges which is substantially different from the infrared spectral range reflected by the road surface. Specifically, each selected paint material may deviate by more than a second value from the infrared spectral range reflected by the road surface. The second value, for example, 20%, 25%, 30% and/or the like may be set to ensure that the selected paint materials are substantially perceptible (visible) in the infrared light spectral range(s) when painted on the road surface.

Moreover, each of the alternating tiles must be clearly differentiated from its adjacent tiles in the infrared spectral range(s). As such the alternating tiles may be painted using two or more paint materials characterized by the characteristics described herein before but are different from each other in their infrared reflectiveness characteristics, attributes and/or parameters.

For example, a first highly reflective paint material which reflects a high level of light in the infrared spectral range(s) may be selected to paint the high infrared reflective tiles while a second highly absorptive paint material which absorbs a high level of light in the infrared spectral range(s) may be selected to paint the low infrared reflective tiles. For example, the first paint material may reflect infrared light deviating by more than the second value from the infrared light reflected by the road surface while the second paint material may reflect infrared light deviating by less than the second value from the infrared light reflected by the road surface. The difference in the infrared light reflection between the high infrared reflective tiles and the low infrared reflective tiles may therefore exceed twice the second value.

Since the surface of the road segment may typically be black, the road markings engine 220 may select infrared reflective and absorptive paint materials, for example, the first and second paint materials which reflect visible light in a spectral range which does not significantly deviate from the visible light spectral range corresponding to black color, grey color and/or the other road surface typical colors.

However, the road markings engine 220 may select only one paint material for painting the alternating tiles, in particular for painting only one type of the tiles, for example, only the high infrared reflective tiles or only the low infrared reflective tiles. In such case, the alternating tiles may be painted with gaps such that empty spaces between the tiles serve as the other type of the alternating tiles. For example, the road markings engine 220 may select an infrared reflective paint material for painting the high infrared reflective tiles which in the infrared spectral range(s) reflects more than the second value compared to the light reflected by the road surface. The high infrared reflective tiles may be painted with gaps such that the road surface itself may serve as the low infrared reflective tiles. In a complementary example, the road markings engine 220 may select an infrared absorptive paint material for painting the low infrared reflective tiles which in the infrared spectral range(s) reflects less than the second value compared to the light reflected by the road surface. The low infrared reflective tiles may be painted with gaps such that the road surface itself may serve as the high infrared reflective tiles.

While the paint materials may include standard paint materials as known in the art which may be applied using one or more painting methods and systems as known in the art, the paint materials may further comprise one or more other materials which may be used to apply the alternating infrared reflective tiles. For example, the paint materials may include one or more thermoplastic materials which may be applied on the road surface. Such thermoplastic materials may be characterized by high infrared reflectiveness and/or high infrared absorption and may therefore highly suitable for applying the alternating infrared reflective tiles.

In step 112, the road markings engine 220 may compute instructions for painting the alternating infrared reflective tiles generated for the road segment on the selected sections and/or regions of the road segment.

Painted using the infrared reflective paint material(s) which reflect and/or absorb infrared light which significantly deviates from the infrared light reflected by the road surface while reflecting visible light which does not significantly deviate from the visible light reflected by the road surface, the alternating infrared reflective tiles may be highly perceptible (visible) in the infrared spectral range(s), for example, NIR, SWIR, etc., while highly imperceptible (invisible) in the visible light spectral range.

In step 114, the road markings engine 220 may output the painting instructions computed for painting the driving assistance markings on one or more of the elements of the road segment using one or more of the infrared visible paint materials Reference is now made to FIG. 7A, FIG. 7B, FIG. 7C, FIG. 7D, FIG. 7E and FIG. 7F, which present images of alternating infrared reflective tiles used to express road markings, according to some embodiments of the present invention.

It should be noted that while the alternating infrared reflective tiles 700 are intended to be painted on the road surface, for demonstration purposes the tiles 700 are expressed by dedicated slabs painted with the infrared reflective paint material which are laid on the road surface. Moreover, as described herein before, the infrared reflective tiles 700 are expressed by the slabs painted using a highly infrared reflective paint material while the road surface gaps between the painted slabs form the low reflective tiles thus together forming the alternating infrared reflective tiles.

Images 702A, 704A, 706A, 708A, 710A and 712A each shows a respective set of alternating infrared reflective tiles 700 captured in the visible light spectral range while images 702B, 704B, 706B, 708B, 710B and 712B each shows the respective set of alternating infrared reflective tiles 700 captured in infrared spectral range, for example, NIR.

As seen in images 702A, 704A, 706A, 708A, 710A and 712A, since the light reflected by the alternating infrared reflective tiles 700 in the visible light spectral range does not significantly deviate from the light reflected by the road surface, in particular deviates by less than the first value, for example, 15%, 20%, 25% and/or the like, the alternating infrared reflective tiles 700 are highly imperceptible in the visible light spectral range.

In contrast, as seen in images 702B, 704B, 706B, 708B, 710B and 712B, since the light reflected by the alternating infrared reflective tiles 700 in the infrared spectral range, for example, NIR significantly deviates from the light reflected by the road surface, in particular deviates by more than the second value, for example, 25%, 30%, 35% and/or the like, the alternating infrared reflective tiles 700 are highly perceptible in the infrared (NIR) spectral range.

According to some embodiments of the present invention, one or more of the automated vehicular systems may be configured to detect and identify the alternating infrared reflective tiles painted on road surfaces which may be used to express road markings.

The alternating infrared reflective tiles may be painted on the road surface either manually and/or automatically by one or more road markings painting apparatuses, systems, machines and/o the like. Moreover, instructions for painting the alternating infrared reflective tiles on the road surface to encode and expressed the road markings may be computed manually by one or more expert users and/or automatically as described herein before.

One or more of the automated vehicular systems may be configured to identify the alternating infrared reflective tiles in at least some of the plurality of spectral ranges, in particular, the visible light spectral range and one or more infrared spectral ranges, for example, NIR, SWIR and/or the like. The automated vehicular system(s) may be further configured to aggregate the alternating infrared reflective tiles detected across the multiple spectral ranges in order to improve detection performance, for example, accuracy, reliability, robustness and/or the like.

Figure 8:
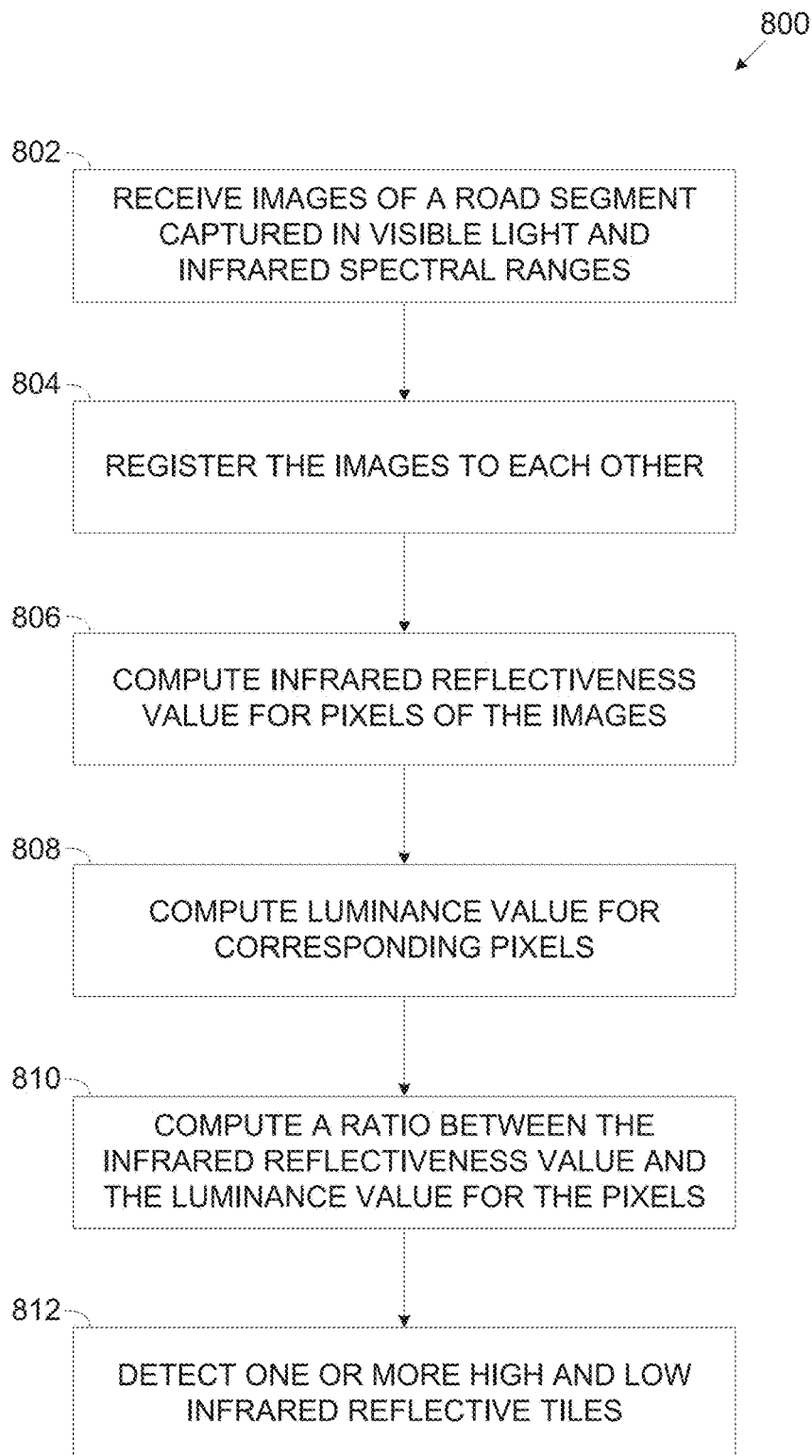
FIG. 8 is a flowchart of an exemplary process of detecting alternating infrared reflective tiles painted using infrared reflective paint material(s) to express road markings, according to some embodiments of the present invention.
Figure 9:
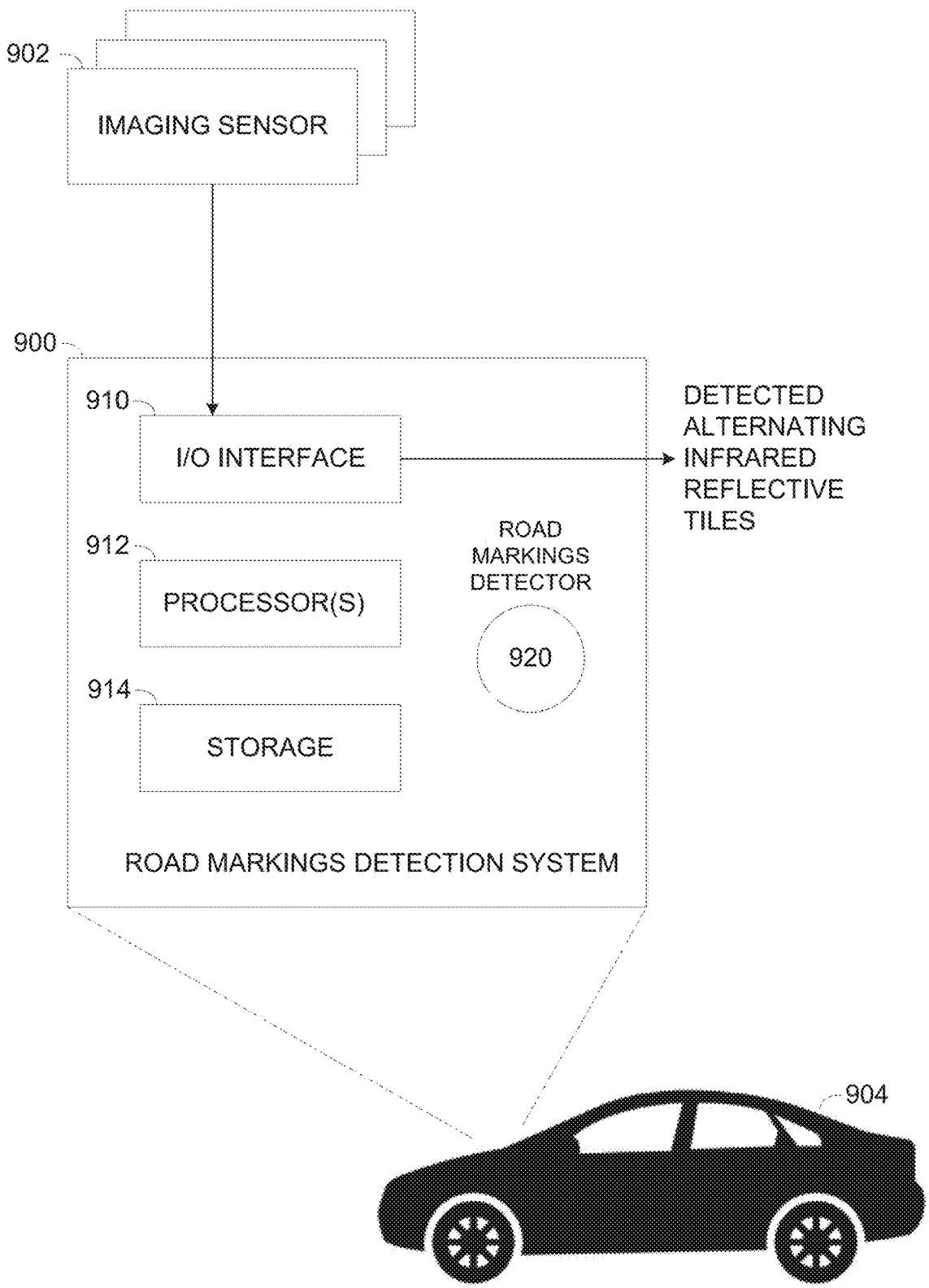
FIG. 9 is a schematic illustration of an exemplary system for detecting alternating infrared reflective tiles painted using infrared reflective paint material(s) to express road markings, according to some embodiments of the present invention.
Figure 10A:
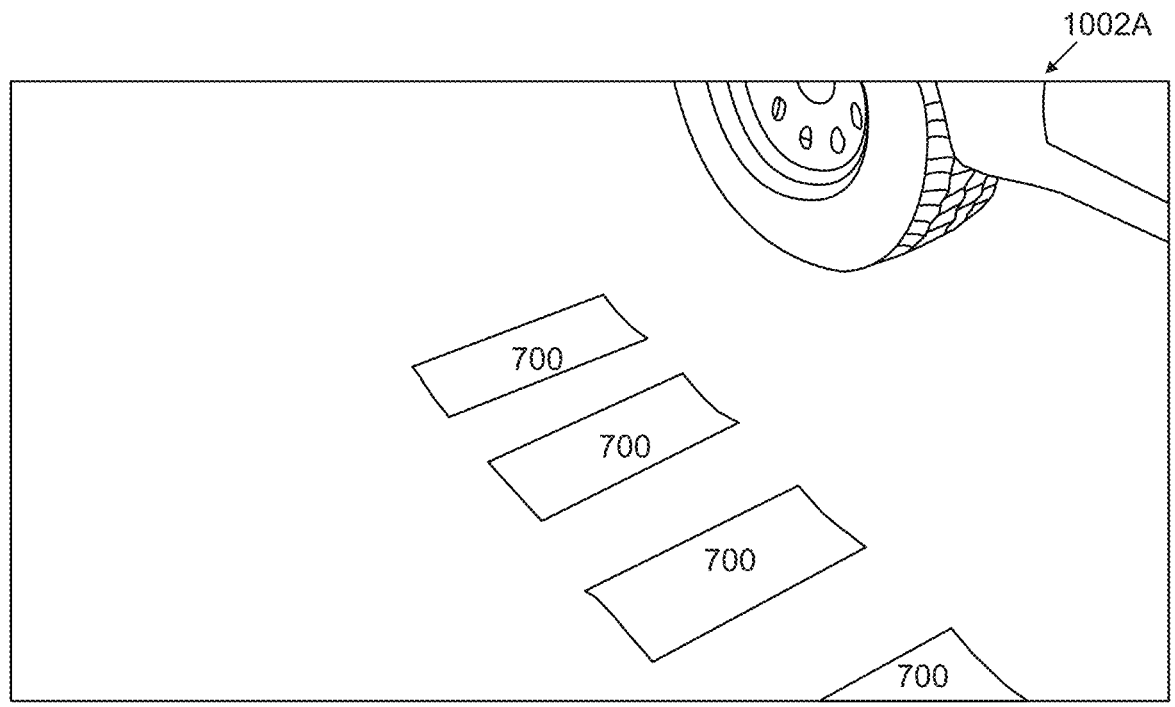
FIG. 10A, FIG. 10B, FIG. 10C, FIG. 10D, FIG. 10E and FIG. 10F present images analyzed to identify alternating infrared reflective tiles painted on a road surface to express road markings, according to some embodiments of the present invention.
Figure 10A:
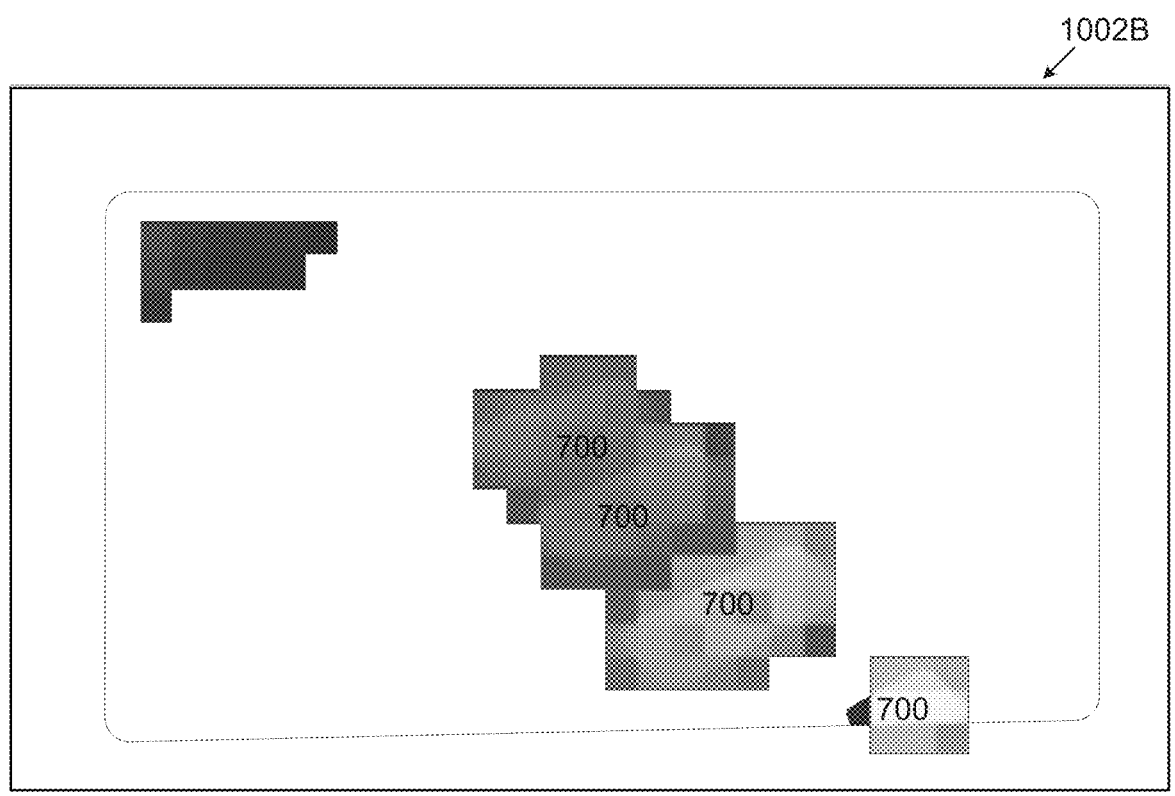
Figure 10B:
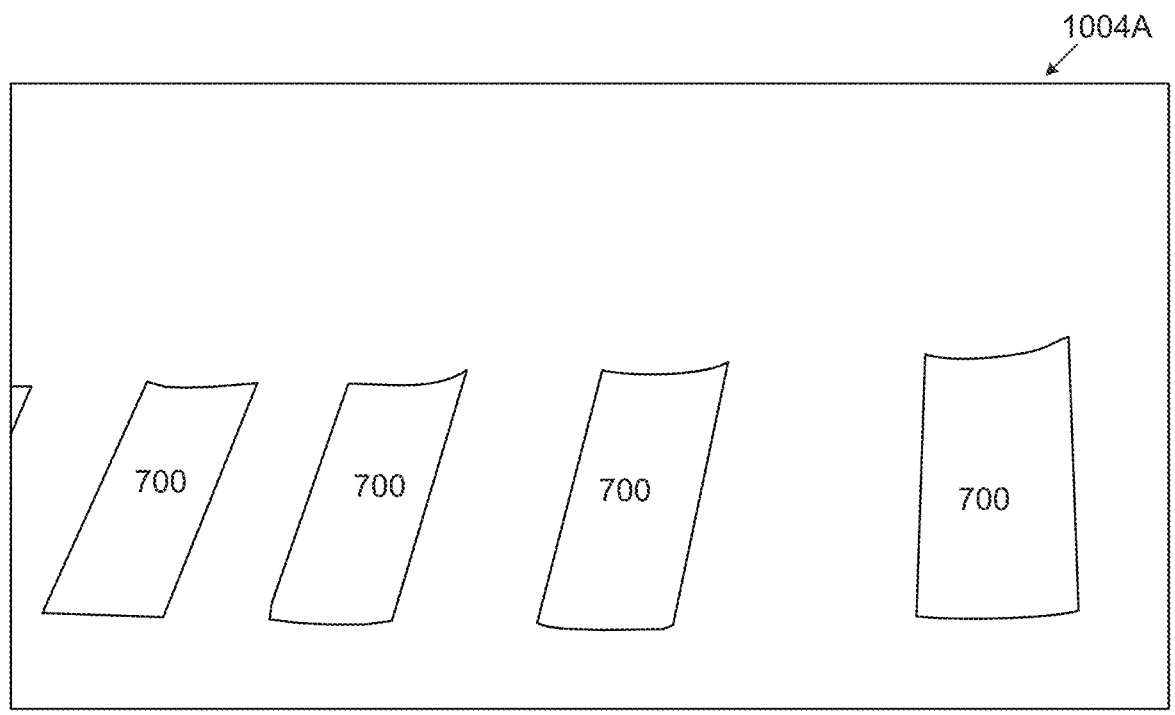
Figure 10B:
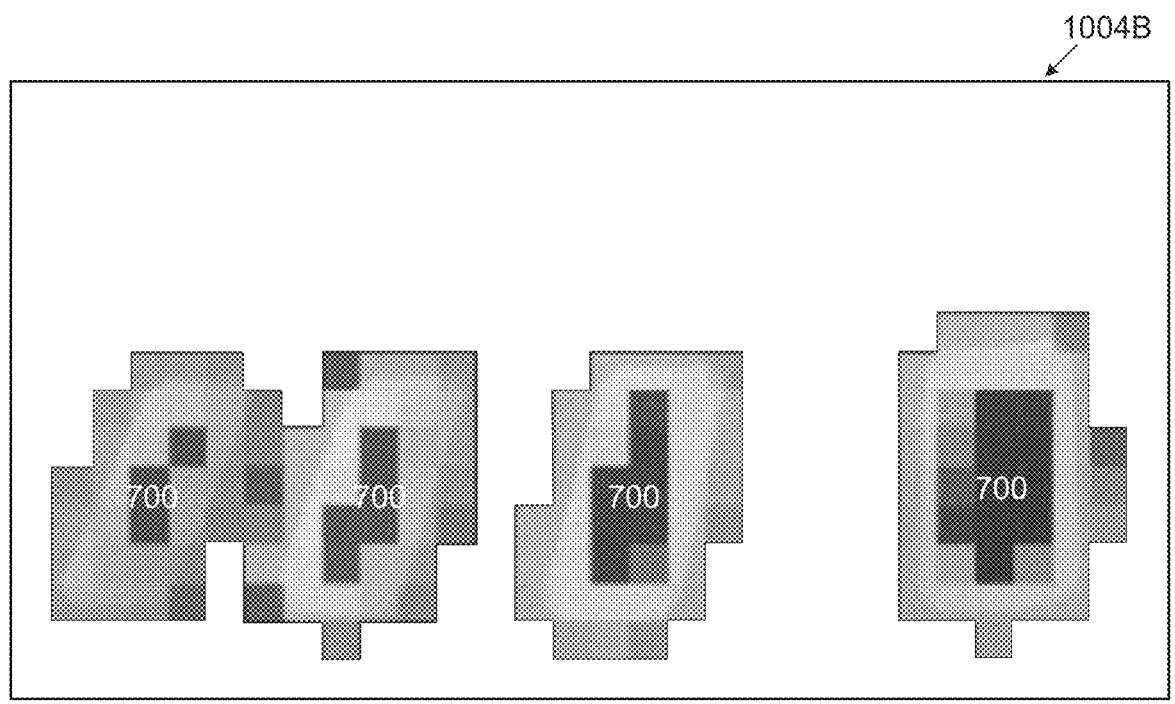
Figure 10C:
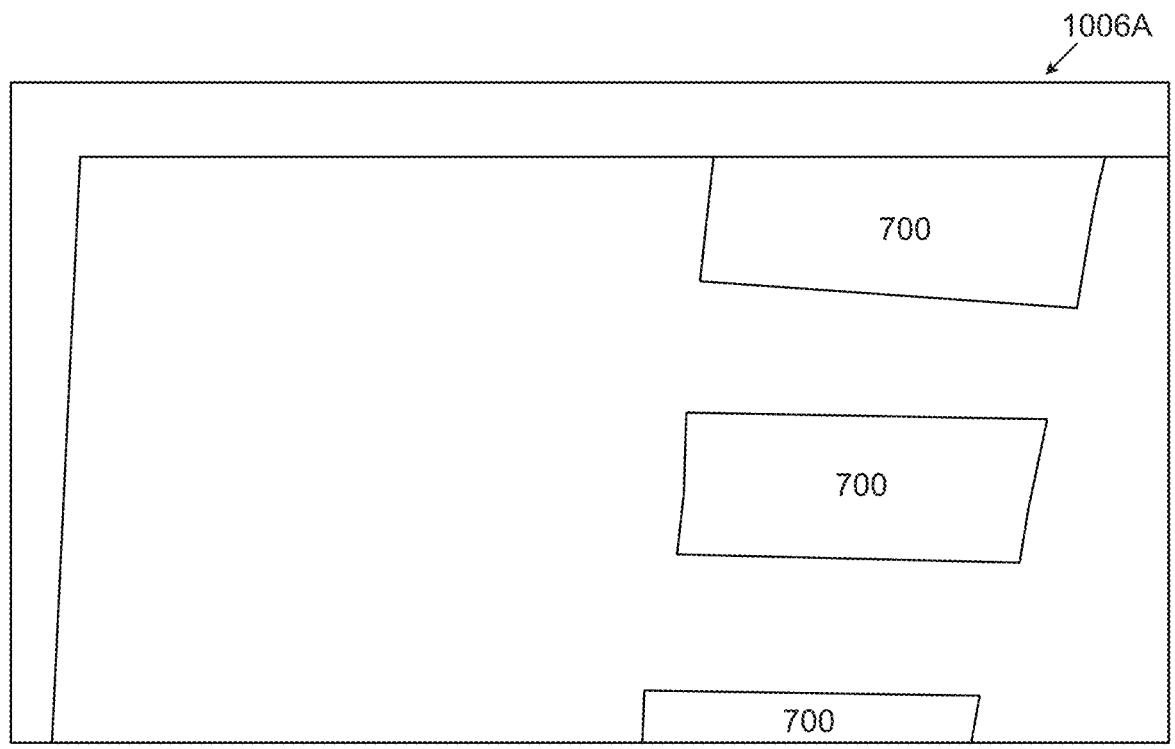
Figure 10C:
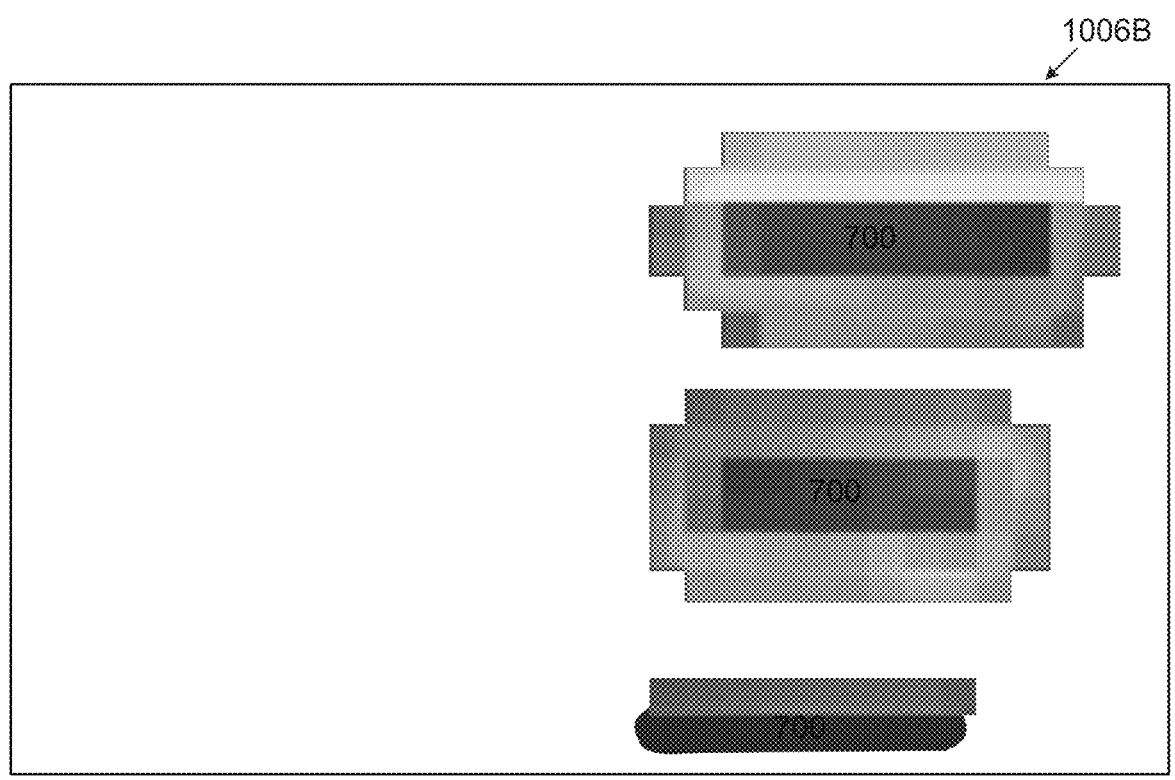
Figure 10D:
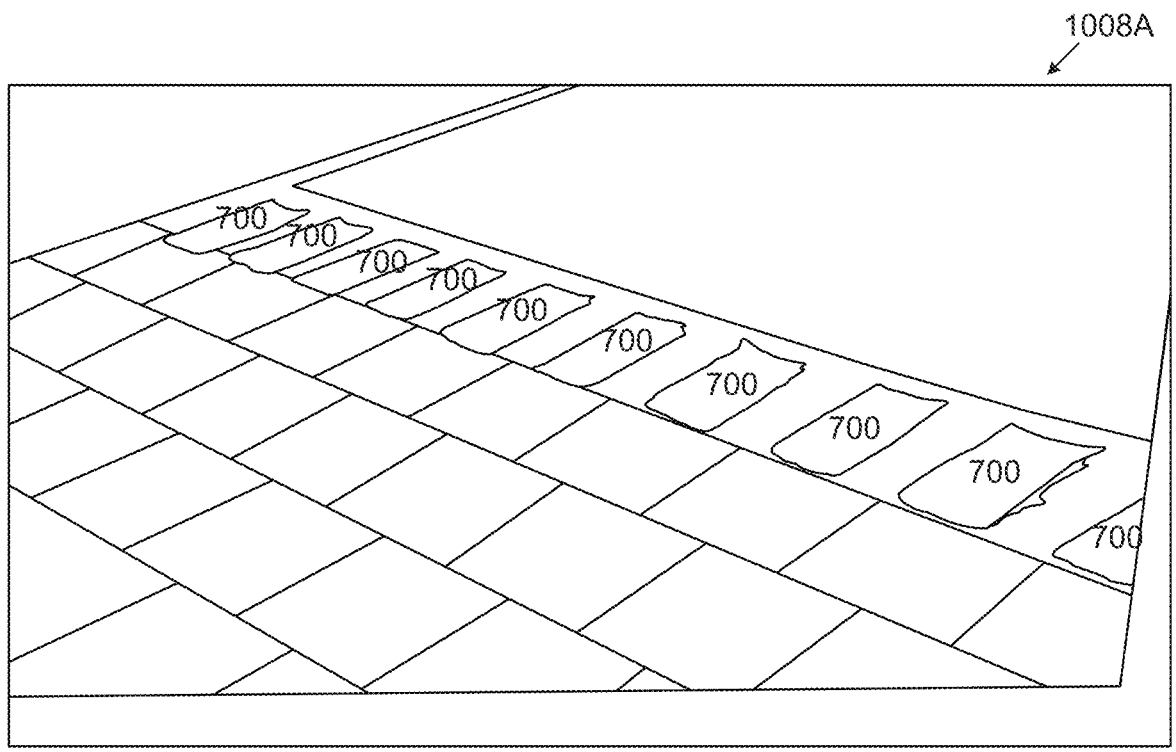
Figure 10D:
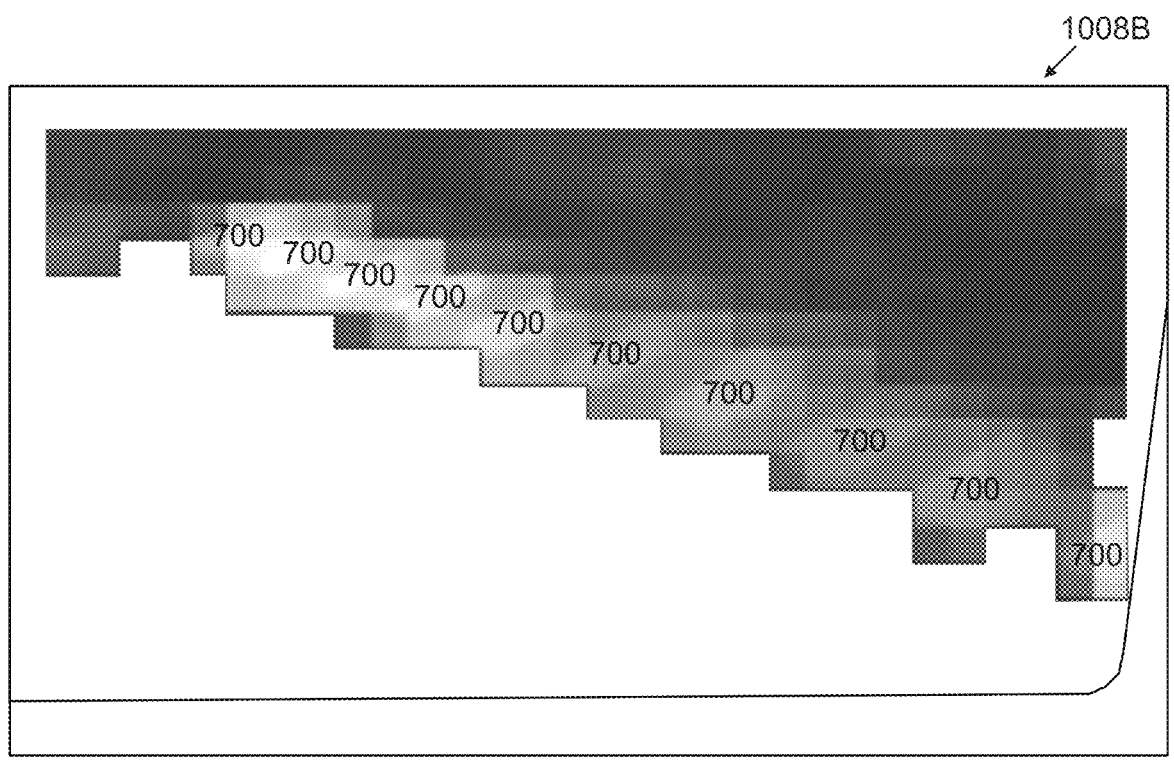
Figure 10E:
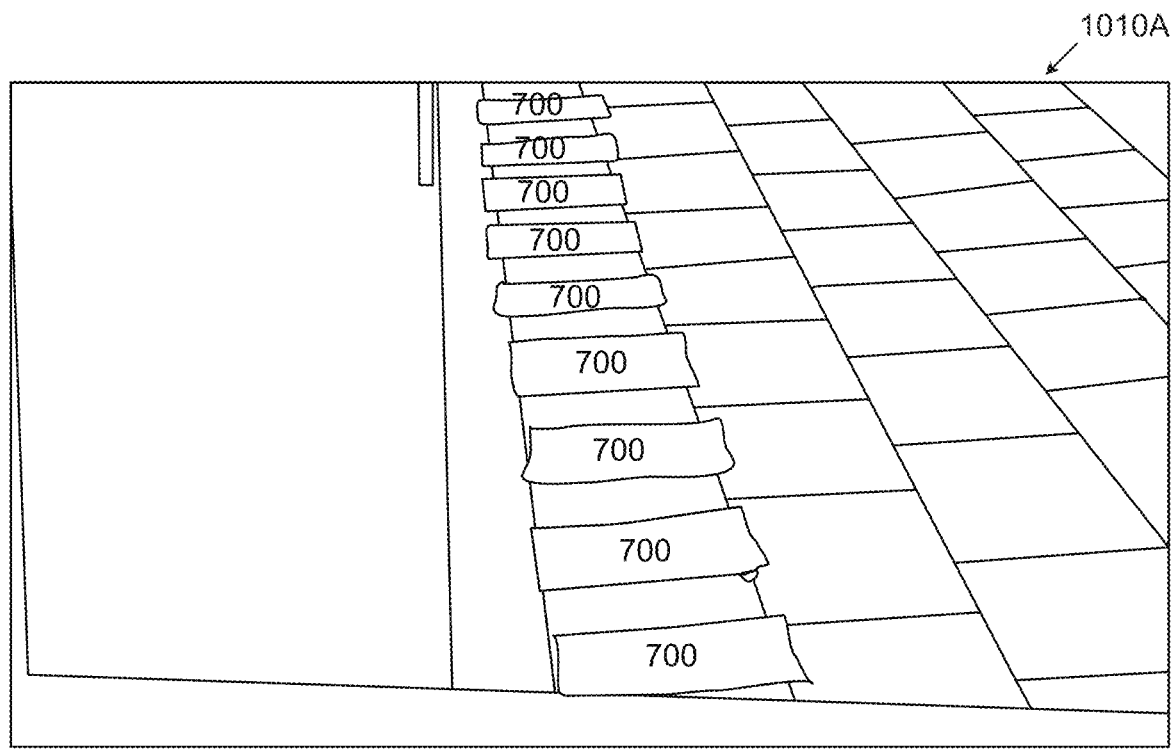
Figure 10E:
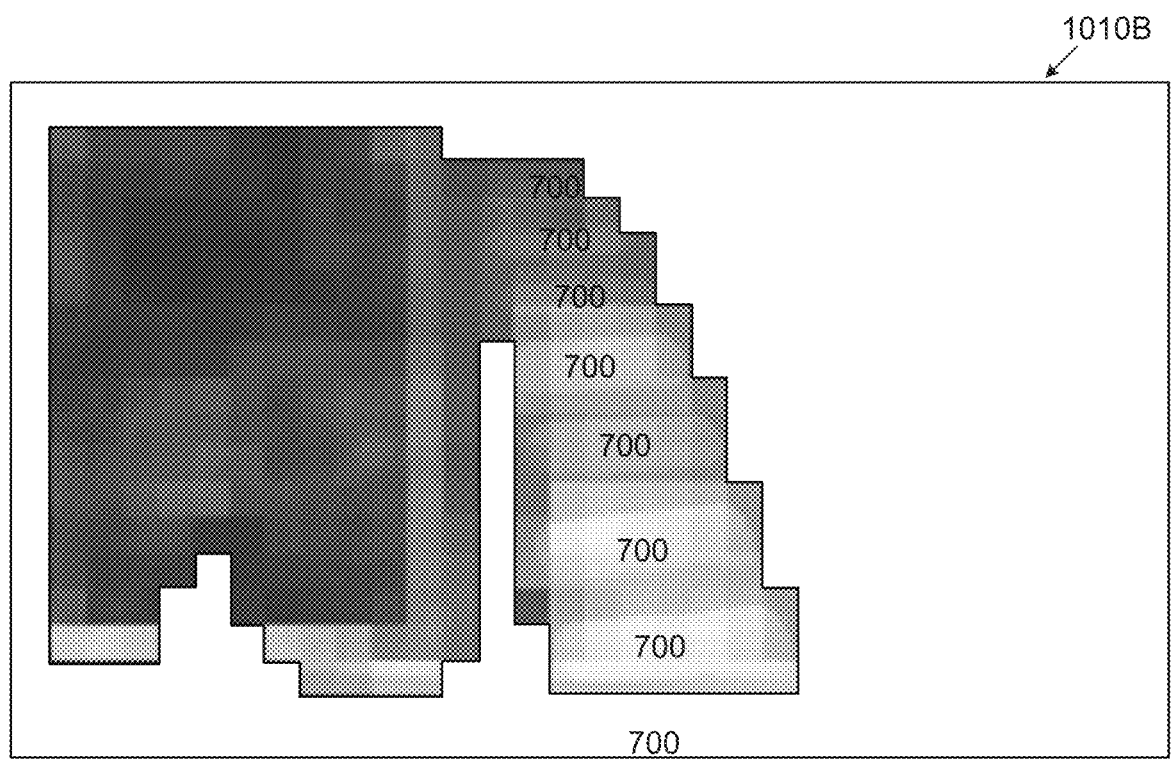
Figure 10F:
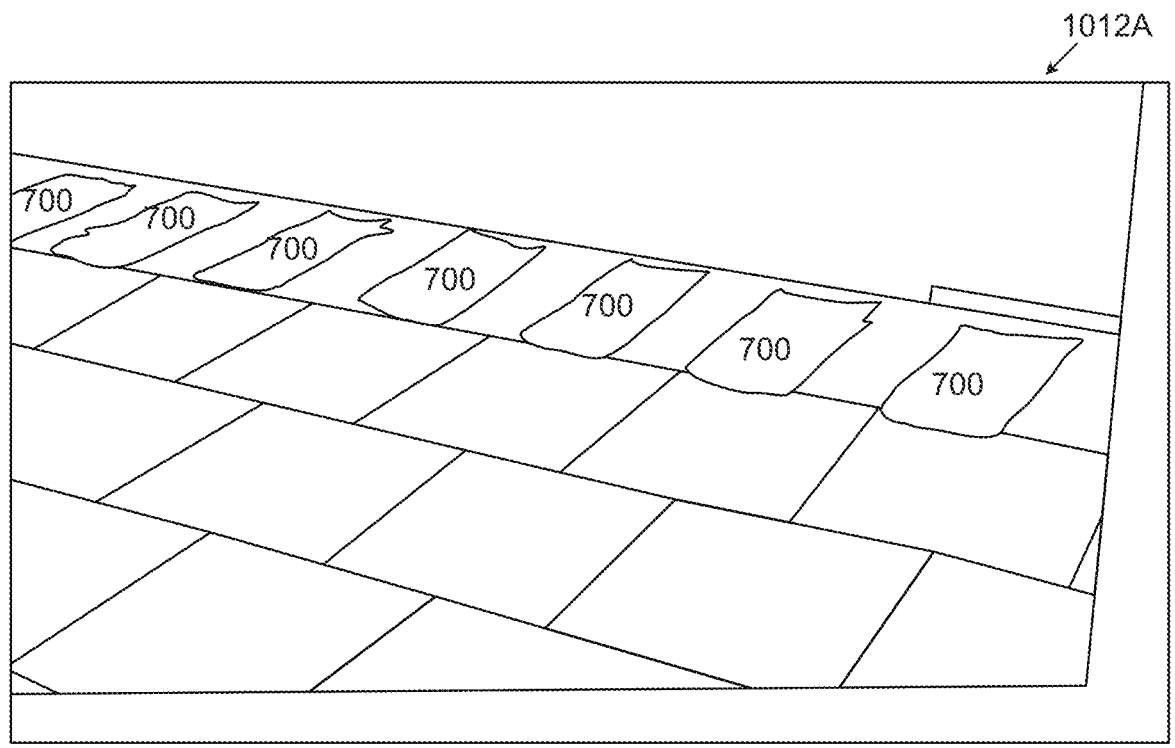
Figure 10F:
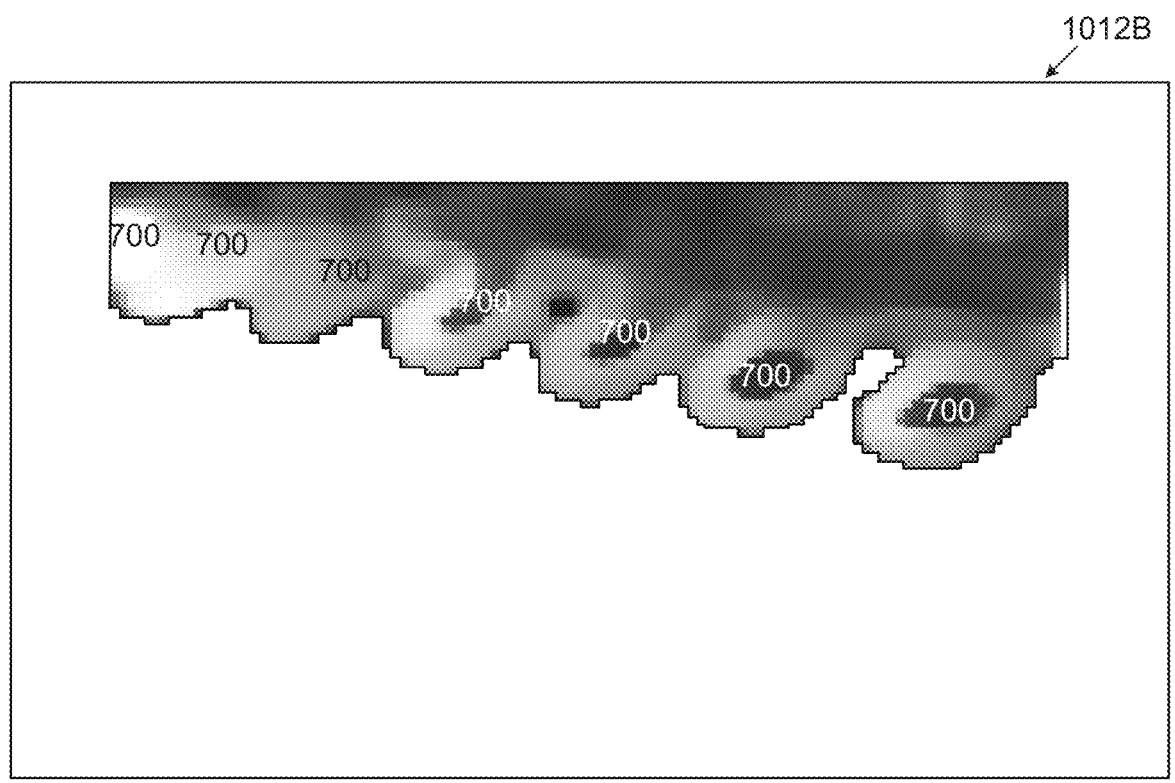

Reference is now made to FIG. 8, which is a flowchart of an exemplary process of detecting alternating infrared reflective tiles painted using infrared reflective paint material(s) to express road markings, according to some embodiments of the present invention. Reference is also made to FIG. 9, which is a schematic illustration of an exemplary system for detecting alternating infrared reflective tiles painted using infrared reflective paint material(s) to express road markings, according to some embodiments of the present invention.

One or more road marking detection system, device, apparatus and/or the like collectively designated road marking detection system 900 may be configured to execute an exemplary process 800 to detect alternating infrared reflective tiles painted on road surfaces using one or more infrared reflective and/or absorptive paint materials to express road markings.

The road marking detection system 900 may be installed, mounted, integrated and/or otherwise coupled to a vehicle 804, for example, a car, a truck, a motorcycle, a train, a bicycle and/or the like to serve one or more automated vehicular system(s) of the vehicle 804 which may be manual, partially autonomous and/or fully autonomous. Optionally, the road marking detection system 900 may be integrated with one or more of the automated vehicular system(s), for example, for example, an ADAS, a vehicular monitoring system, a vehicular alert system, a vehicular control system and/or the like of the vehicle 804.

The road marking detection system 900 may include an I/O interface 910 such as the I/O interface 210, a processor(s) 912 such as the processor(s) 212 for executing the process 800 and a storage 914 such as the storage 214 for storing data and/or code (program store).

Via the I/O interface 910, interface comprising one or more network interfaces and/or interconnection interfaces, the road marking detection system 900 may connect and/or communicate with one or more other systems, devices and/or services which may be local at the vehicle 804 and/or remote, for example, a remote server, a cloud service, a cloud platform and/or the like.

Specifically, via the I/O interface 910, the road marking detection system 900 may communicate with one or more imagining sensors 902 installed, mounted, integrated and/or otherwise coupled to a vehicle 804 which are deployed and configured to monitor and capture images of the external environment of the vehicle 804. The imaging sensors 902 may include, for example, the camera, the infrared camera, the thermal mapping camera and/or the like configured to capture images of the vehicle's surroundings in a plurality of spectral ranges, for example, visible light spectrum, NIR spectrum, SWIR spectrum and/or the like.

Each of the imaging sensor(s) 902 may be configured to operate in one or more of the plurality of spectral ranges and capture images in the respective spectral range(s). For example, one or more of the imaging sensor(s) 902 may be configured to operate in a single one of the spectral ranges, for example, only in the visible light range, only in NIR range, only in SWIR range and/or the like. However, one or more of the imaging sensor(s) 902 may be configured to operate in multiple spectral ranges, for example, in the visible light range and in the NIR range, in the visible light range and in the SWIR range, in the visible light range and in the NIR range and in the SWIR range and/or the like.

The processor(s) 912 may execute one or more software modules such as, for example, a process, a script, an application, an agent, a utility, a tool, an OS and/or the like each comprising a plurality of program instructions stored in a non-transitory medium (program store) such as the storage 914 and executed by one or more processors such as the processor(s) 912. The processor(s) 912 may optionally, integrate, utilize and/or facilitate one or more hardware elements (modules) integrated and/or utilized in the road markings generation system 200, for example, a circuit, a component, an IC, an ASIC, an FPGA, a DSP, a GPU and/or the like.

The processor(s) 912 may therefore execute one or more functional modules implemented using one or more software modules, one or more of the hardware modules and/or combination thereof. For example, the processor(s) 912 may execute a road markings detector 920 functional module configured to execute the process 800 for detecting the infrared alternating tiles painted on the road surface to express road markings.

As shown at 802, the road marking detection system 900, specifically the road markings detector 920 may receive a plurality of images captured by the imaging sensor(s) 902 to depict the external environment of the vehicle 804.

In particular, since the imaging sensor(s) 902 are configured to operate in the plurality of spectral ranges, specifically in the visible light spectral ranges and one or more of the infrared spectral ranges (e.g. NIR, SWIR, etc.), the received images may depict the driving assistance markings and/or part thereof in at least some different spectral ranges.

The imaging sensor(s) 902 may be mounted, coupled, attached and/or integrated with the vehicle 804 such that a Field of View (FOV) of the imaging sensor(s) 902 is parallel to the road surface such that the images captured by the imaging sensor(s) 902 may depict one or more of the road surface sections, regions and/or portions painted with the alternating infrared reflective tiles.

Moreover, one or more dimensions of the alternating infrared reflective tiles, for example, size, length, width, depth, etc. may be predefined. The imaging sensor(s) 902 may be therefore selected and positioned on the vehicle 804 with respect to the road surface to capture images depicting several alternating infrared reflective tiles, specifically at least one high infrared reflective tile and at least one high infrared reflective tile. Also, since the resolution of the imaging sensor(s) 902 is known, a pixel size of the pixels in the images may be easily translated to real world dimensions to enable proper positioning of the imaging sensor(s) 902 to capture images depicting multiple alternating infrared reflective tiles.

Optionally, one or more light sources may be operated to project (emit) light on the road surface, specifically on one or more road portion, sections and/or regions of the road surface where the alternating infrared reflective tiles are painted. The light source(s) may be operated to emit light in one or more of the light spectral ranges, for example, the visible light spectral range, one or more of the infrared spectral ranges, such as, for example, NIR, SWIR and/or the like. Illuminating the road surface may significantly improve the ability to detect the alternating infrared reflective tiles in the images captured by the imaging sensor(s) 902.

One or more of the light source(s) may be coupled, mounted, attached and/or integrated in the vehicle 804 and may be optionally operated by the road markings detector 920. However, one or more of the light source(s) may be independent and distinct from the vehicle 804 and may include, for example, light infrastructure deployed to illuminate the road segment.

As shown at 804, the road markings detector 920 may register (align) images captured in different spectral ranges to establish a common reference between the images, for example, a common coordinate system and/or the like such that corresponding pixels in the images captured in different spectral ranges which depict the same spectral location in the real world may overlap with each other. The road markings detector 920 may apply one or more methods and/or techniques as known in the art to register the images in the visible light spectral range and one or more of the infrared spectral ranges.

For example, the road markings detector 920 may register the images captured in the visible light spectral range and images captured in the infrared spectral range(s) based on calibration of the imaging sensor(s) 902 which captured the images. For example, assuming the received images are captured in the different spectral ranges by a certain single imaging sensor 902 configured to operate in multiple spectral ranges. In such case, the operational parameters and/or mounting parameters of the certain imaging sensor 902, for example, positioning, orientation, field of view, zoom, resolution and/or the like may be known and typically common to the images captured in the visible light spectral range and images captured in the infrared spectral range(s). The single certain single imaging sensor 902 may be therefore inherently calibrated and the road markings detector 920 may register accordingly the images captured in the different spectral ranges. In another example, assuming the received images are captured in the different spectral ranges by multiple distinct imaging sensors 902 each configured to operate in one or more of the spectral ranges. In such case, the road markings detector 920 may calibrate the different imaging sensors 902 according to known positioning, operational and/or mounting parameters of the plurality of imaging sensors 902 with respect to each other and may register accordingly the images received these distinct imaging sensors 902.

In another example, the road markings detector 920 may register the images captured in the visible light spectral range and images captured in the infrared spectral range(s) based on one or more reference feature painted on one or more portions, sections and/or regions of the road surface, for example, a symbol, a sign, a marking, a pole, a barrier rail and/or the like. The road markings detector 920 may analyze image(s) captured by a first imaging sensor 902, for example, in the visible light spectral range and image(s) captured by a second imaging sensor 902, for example, in the NIR spectral range to identify one or more of the reference feature(s), for example, a + sign. The road markings detector 920 may map the + sign detected in the image(s) captured by the first imaging sensor 902 to the + sign detected in the image(s) captured by the second imaging sensor 902 and may register the images accordingly.

As shown at 806, the road markings detector 920 may analyze the image(s) captured in the infrared spectral range(s) to compute an infrared reflectiveness value as known in the art for each of the pixels of the image(s).

Optionally, since the positioning, operational and/or mounting parameters of the imaging sensor(s) 902 may be known, in particular with respect to the position and/or location of the alternating infrared reflective tiles painted on the road segment, the road markings detector 920 may compute the infrared reflectiveness value for only a subset of the pixels of the image(s). Specifically, the road markings detector 920 may compute the infrared reflectiveness value for a subset of pixels which is mapped to one or more regions in the image(s) which are estimated and/or known to depict the alternating infrared reflective tiles, specifically, at least one high infrared reflective tile and at least one low infrared reflective tile.

As described herein before, in the infrared spectral range(s), the light reflected by the high infrared reflective tiles may significantly deviate from the light reflected by the low infrared reflective tiles. The infrared reflectiveness value computed for pixels mapped to the high infrared reflective tiles may be therefore significantly higher compared to the infrared reflectiveness value computed for pixels mapped to the low infrared reflective tiles.

Moreover, the light reflected in the infrared spectral range(s) by both the high and low infrared reflective tiles significantly deviates from the infrared light reflected by the road surface, specifically by the second value. The infrared reflectiveness value computed for the pixels mapped to either the high infrared reflective tiles and the low infrared reflective tiles may therefore significantly differ compared to the infrared reflectiveness value computed for pixels mapped to road surface sections which are not painted with the alternating infrared reflective tiles.

As shown at 808, the road markings detector 920 may analyze the image(s) captured in the visible spectral range to compute a luminance (brightness) value as known in the art for each of the pixels of the image(s).

Optionally, as described in step 806, the road markings detector 920 may compute the luminance value for only the subset of the pixels of the image(s) mapped to the region(s) in the image(s) which are estimated and/or known to depict the alternating infrared reflective tiles, specifically, the at least one high infrared reflective tile and the at least one low infrared reflective tile.

As described herein before, in the visible light spectral range, both the high infrared reflective tiles and the low infrared reflective tiles reflect light which deviates by less than the first value from the light reflected by the road surface. The visible light reflected by the high and low infrared reflective tiles is therefore significantly similar and hence, the luminance values computed for the pixels mapped to either the high infrared reflective tiles and the low infrared reflective tiles may be substantially similar.

Moreover, the visible light reflected by the high and low infrared reflective tiles is significantly similar to the visible light reflected by the road surface. The luminance values computed for the pixels mapped to either the high infrared reflective tiles and the low infrared reflective tiles may be therefore also substantially similar to the luminance values computed for pixels mapped to road surface sections which are not painted with the alternating infrared reflective tiles.

As shown at 810, for each pixel, the road markings detector 920 may compute a ratio between the infrared reflectiveness value and the luminance value computed for the respective pixel.

The ratio is computed to filter out pixels which are mapped (i.e., depict) objects other than the road surface and may therefore reflect visible light which significantly deviates from the light reflected by the road surface, for example, by more than the first value and hence reflects visible light that also significantly deviates from the light reflected by the high and/or low infrared reflective tiles.

Since the infrared reflectiveness values computed for the pixels depicting the high infrared reflective tiles may be significantly high compared to the infrared reflectiveness values computed for the pixels depicting the low infrared reflective tiles while the luminance values computed for both these pixels is substantially similar, the ratio computed for the pixels mapped to the high infrared reflective tiles may be significantly higher compared to the ratio computed for the pixels mapped to the low infrared reflective tiles.

For example, assuming the alternating infrared reflective tiles are painted using a single paint material with the road surface gaps between the tiles serving as the other type of alternating tiles. In such case, the difference between the ratio computed for the pixels mapped to the painted tiles and the ratio computed for the unpainted road surface may exceed a third value, for example, 25%, 30%, 35% and/or the like.

In another example, assuming the alternating infrared reflective tiles are painted using several paint materials, for example, the first highly reflective paint material for painting the high infrared reflective tiles and the second highly absorptive paint material for painting the low infrared reflective tiles. In such case, the difference between the ratio computed for the pixels mapped to the high infrared reflective tiles and the ratio computed for the pixels mapped to the low infrared reflective tiles may exceed by far the third value and may be as high as twice the second value, for example, 60%, 70%, 80% and/or the like.

As shown at 812, the road markings detector 920 may detect the alternating infrared reflective tiles based on the difference correlate between the ratio computed for adjacent pixels of the images depicting the one or more high infrared reflective tiles and one or more low infrared reflective tiles.

When detecting a large difference between ratio values computed for adjacent pixels, the road markings detector 920 may determine that the difference indicates an edge (border) of tile, either a high infrared reflective tile or a low infrared reflective tile. Analyzing all pixels of the images or at least the subset of pixels if applicable, the road markings detector 920 may identify the alternating infrared reflective tiles accordingly.

The road markings detector 920 may further apply one or more smoothing, sharpening and/or manipulation algorithms, tools and/or techniques to improve detection of the alternating infrared reflective tiles.

For example, the road markings detector 920 compute the difference of the ratio value computed for each pixel compared to the ratio values of the adjacent pixels according to a median computed based on a sliding window comprising a group of pixels around the respective pixel. The road markings detector 920 may move the sliding window over the pixels of the image(s) or at least over the subset of pixels mapped to the section(s) of the image(s) estimated to depict at least one high infrared reflective tile and at least one low infrared reflective tile. In each window (position) the road markings detector 920 may compute a median (middle) value for the ratio values of the pixels. In particular, the sliding window may include a predefined number of pixels, for example, 5×5 and the road markings detector 920 may compute a median value for the middle pixel based on the difference between the ratio values computed for the middle pixel and the ratio values computed for the surrounding pixels in the sliding window. The sliding window may be moved by a predefined step, typically 1 pixel across the image(s) such that the median value may be computed for each pixel.

Reference is now made to FIG. 10A, FIG. 10B, FIG. 10C, FIG. 10D, FIG. 10E and FIG. 10F, which present images analyzed to identify alternating infrared reflective tiles painted on a road surface to express road markings, according to some embodiments of the present invention.

FIG. 10A, FIG. 10B, FIG. 10C, FIG. 10D, FIG. 10E and FIG. 10F present images which are analyzed by a road markings detector such as the road markings detector 920 to identify alternating infrared reflective tiles 700 painted on a road surfaces as described in corresponding FIG. 7A, FIG. 7B, FIG. 7C, FIG. 7D, FIG. 7E and FIG. 7F.

Images 1002A, 1004A, 1006A, 1008A, 1010A and 1012A present ratio computation mapping for the ratio values computed by the road markings detector 920 for the pixels in originally received images 702A, 704A, 706A, 708A, 710A and 712A respectively. As evident, based on the ratio mapping the road markings detector 920 may identify the alternating infrared reflective tiles 700 based on a difference exceeding the third value.

However, one or more elements, objects and/or the like, for example, vegetation, debris, garbage, paint spillage and/or the like which may be present in the images may interfere with analysis and may significantly reduce the detection performance, for example, accuracy, effectivity, reliability, robustness and/or the like of the road markings detector 920 to detect the alternating infrared reflective tiles 700. For example, as seen in image 702A a vehicle wheel is detected which is also evident in the corresponding image 1002A and may thus reduce the ability of the road markings detector 920 to accurately detect the alternating infrared reflective tiles 700. In another example, as in images 708A, 710A and 712A there is vegetation to the side of the road segment which is also detected in the corresponding image 1008A, 1010A and 1012A and may thus reduce the ability of the road markings detector 920 to accurately detect the alternating infrared reflective tiles 700.

In order to overcome this, the road markings detector 920 may apply the smoothing algorithms, in particular the sliding window as described herein before to produce high separation images in which detection of the alternating infrared reflective tiles 700 may be significantly improved and increased as demonstrated in images 1002B, 1004B, 1006B, 1008B, 1010B and 1012B which correspond to images 1002A, 1004A, 1006A, 1008A, 1010A and 1012A after applied with the sliding window.

As seen, the potentially interfering elements and/or objects are removed by applying the sliding window thus increasing the detection performance of the road markings detector 920 to detect the alternating infrared reflective tiles 700.

The road markings detector 920 may output the detected alternating infrared reflective tiles and/or an indication of the alternating infrared reflective tiles which may be used by one or more of the automated vehicular systems of the vehicle 804 to control and/or maneuver the vehicle 804, for example, monitor, break, accelerate, decelerate, turn and/or the like. While the road markings detector 920 may provide the detected alternating infrared reflective tiles in visual form, typically the road markings detector 920 may output an indication of the detected alternating infrared reflective tiles describing them in terms and/or format that is recognizable and decodable by the automated vehicular system(s), for example, a position, a location, a distance and/or the like of one or more elements referenced by the alternating infrared reflective tiles, for example, a road edge, a road shoulder, a lane operator, additional road markings and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms infrared reflective, absorptive and/or semi-transparent paint materials are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of detecting road marking in infrared spectral range, comprising:
    using at least one processor for:
        receiving at least one infrared image depicting, in at least one infrared spectral range, a portion of an edge of a road surface painted with road markings expressed using alternating high and low infrared reflective tiles and at least one visible light image depicting the portion of a road surface in visible light spectral range, the infrared reflective tiles are painted using at least one paint material characterized by: (1) reflecting light in visible light spectral range deviating less than a first value from the light reflected by the road surface, and (2) reflecting light in an infrared spectral range deviating more than a second value from the light reflected by the road surface;
        registering the at least one infrared image to the at least one visible light image;
        computing a ratio between an infrared reflectiveness value of each of a plurality of pixels of the at least one infrared image and a luminance value computed for a corresponding pixel in the registered at least one visible light image; and
        detecting at least one high reflectiveness tile and at least one low reflectiveness tile based on a difference between the ratio of adjacent pixels exceeding a third value.

2. The method of claim 1, wherein the first value equals 20%, the second value equals 25% and the third value equals 30%.

3. The method of claim 1, further comprising computing the difference of the ratio of each pixel compared to the ratio of the adjacent pixels according to a median computed based on a sliding window comprising a group of pixels around the respective pixel.

4. The method of claim 3, wherein the sliding window is moved over a section of the registered at least one visible light image and at least one infrared image which includes at least one high infrared reflective tile and at least one low infrared reflective tile.

5. The method of claim 3, wherein the size of the sliding window is 5×5 pixels and is moved in 1 pixel steps.

6. The method of claim 1, wherein the at least one infrared spectral range is a member of a group consisting of: near infrared (NIR) having a wavelength in a range of 700-1400 nanometers and short wave infrared (SWIR) having a wavelength in a range of 1400-3000 nanometers.

7. The method of claim 1, further comprising operating at least one light source to project light on the portion of the road surface in at least one of a plurality of spectral ranges comprising visible light spectral range and at least one infrared spectral range.

8. The method of claim 1, wherein registering the at least one infrared image to the at least one visible light image is based on at least one reference feature painted on the portion of the road surface which is identified in the at least one visible light image and in the at least one infrared image.

9. The method of claim 1, wherein registering the at least one infrared image to the at least one visible light image is based on a calibration of at least one imaging sensor configured to capture the at least one infrared image with respect to at least one imaging sensor configured to capture the at least one visible light image.

10. The method of claim 9, wherein the at least one imaging sensor is coupled to at least one vehicle such that a field of view (FOV) of the at least one imaging sensor is parallel to the edge of the road surface.

11. The method of claim 9, wherein the ratio and difference values are computed for a subset of the plurality of pixels contained in at least one section of the at least one infrared image which is defined to depict at least one high reflectiveness tile and at least one low reflectiveness tile based on a positioning of the at least one imaging sensor configured to capture the at least one infrared image and the at least one visible light image.

12. The method of claim 1, further comprising outputting the detected road markings to at least one automatic vehicular system configured to operate accordingly.

13. The method of claim 11, wherein the road markings are directed to support the at least one automatic vehicular system of at least one vehicle by at least one of:
provide the at least one automatic vehicular system information relating to at least one transportation infrastructure object located in at least one road segment, and
assist the at least one automatic vehicular system to conduct at least one control operation of the at least one vehicle.

14. A system for detecting road marking in infrared spectral range, comprising:
at least one processor configured to execute a code, the code comprising:
code instruction to receive at least one infrared image depicting, in at least one infrared spectral range, a portion of an edge of a road surface painted with road markings expressed using alternating high and low infrared reflective tiles and at least one visible light image depicting the portion of a road surface in visible light spectral range, the infrared reflective tiles are painted using at least one paint material characterized by: (1) reflecting light in visible light spectral range deviating less than a first value from the light reflected by the road surface, and (2) reflecting light in an infrared spectral range deviating more than a second value from the light reflected by the road surface;
code instruction to register the at least one infrared image to the at least one visible light image;
code instruction to compute a ratio between an infrared reflectiveness value of each of a plurality of pixels of the at least one infrared image and a luminance value computed for a corresponding pixel in the registered at least one visible light image; and
code instruction to detect at least one high reflectiveness tile and at least one low reflectiveness tile based on a difference between the ratio of adjacent pixels exceeding a third value.

15. A method of computing instructions for painting road markings detectable in infrared spectral range, comprising:
using at least one processor for:
computing instructions for painting road markings expressed using alternating high and low infrared reflective tiles on a road surface using at least one paint material characterized by: (1) reflecting light in visible light spectral range deviating less than a first value from the light reflected by the road surface, and (2) reflecting light in an infrared spectral range deviating more than a second value from the light reflected by the road surface; and
outputting the painting instructions for applying the at least one paint material on the road the road such that the road markings are visible in the infrared spectral range and imperceptible in the visible spectral range.

* * * * *